United States Patent
Paladugu et al.

(10) Patent No.: US 12,010,579 B2
(45) Date of Patent: *Jun. 11, 2024

(54) MAKE-BEFORE-BREAK (MBB) HANDOVER OPERATIONS

(71) Applicant: QUALCOMM Incorporated, San Diego, CA (US)

(72) Inventors: Karthika Paladugu, San Diego, CA (US); Ozcan Ozturk, San Diego, CA (US); Prasad Reddy Kadiri, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,442

(22) Filed: Jan. 23, 2023

(65) Prior Publication Data
US 2023/0164656 A1    May 25, 2023

Related U.S. Application Data

(63) Continuation of application No. 17/062,194, filed on Oct. 2, 2020, now Pat. No. 11,564,141.
(Continued)

(51) Int. Cl.
*H04W 36/00* (2009.01)
*H04W 36/18* (2009.01)

(52) U.S. Cl.
CPC ....... *H04W 36/18* (2013.01); *H04W 36/0016* (2013.01); *H04W 36/0055* (2013.01)

(58) Field of Classification Search
CPC ............. H04W 36/18; H04W 36/0016; H04W 36/0055; H04W 8/24; H04W 36/0027; H04W 36/0022; H04W 36/0033
See application file for complete search history.

(56) References Cited

U.S. PATENT DOCUMENTS 9,380,494 B2 *   6/2016   Sirotkin ............ H04W 28/0226
10,687,263 B2    6/2020   Paladugu et al.
(Continued)

FOREIGN PATENT DOCUMENTS

CN   108024294 A   5/2018
CN   108605254 A   9/2018
(Continued)

OTHER PUBLICATIONS

Ericsson: "Split SRB: Remaining Issues of Initial State, Path Selection and Duplication", R2-1706630, 3GPP TSG-RAN WG2 NR AH#2, Qingdao, P.R. of China, Jun. 27-29, 2017, pp. 1-3.
(Continued)

*Primary Examiner* — Ahmed Elallam
(74) *Attorney, Agent, or Firm* — QUALCOMM Incorporated

(57) ABSTRACT

Aspects of the present disclosure relate to wireless communications, and more particularly, to performing a handover on a per-data radio bearer (DRB) basis. In some examples, the disclosure is directed to indicating, to a source network entity, a make-before-break (MBB) handover capability of the UE, the MBB handover capability supporting MBB handovers for one or more DRBs identified by the source network entity. In some examples, the disclosure describes receiving, from the source network entity, configuration information for a handover from the source network entity to a target network entity, the configuration information identifying the one or more DRBs supported for the MBB handover.

18 Claims, 11 Drawing Sheets

Related U.S. Application Data

(60) Provisional application No. 62/910,303, filed on Oct. 3, 2019.

(56) References Cited

U.S. PATENT DOCUMENTS

| | | | |
|---|---|---|---|
| 10,772,021 B2 | 9/2020 | Wang et al. | |
| 10,869,241 B2 * | 12/2020 | Ozturk | H04W 74/0833 |
| 10,893,446 B2 | 1/2021 | Xu et al. | |
| 11,006,342 B2 | 5/2021 | Paladugu et al. | |
| 11,190,997 B2 | 11/2021 | Kim et al. | |
| 11,564,141 B2 | 1/2023 | Paladugu et al. | |
| 11,653,264 B2 * | 5/2023 | Paladugu | H04L 69/04 |
| | | | 370/329 |
| 11,818,611 B2 * | 11/2023 | Muller | H04W 36/0079 |
| 2019/0149421 A1 | 5/2019 | Jin et al. | |
| 2019/0150219 A1 | 5/2019 | Wang et al. | |
| 2019/0159086 A1 | 5/2019 | Xu et al. | |
| 2019/0253945 A1 | 8/2019 | Paladugu et al. | |
| 2020/0029260 A1 | 1/2020 | Kadiri et al. | |
| 2020/0367101 A1 | 11/2020 | Paladugu et al. | |
| 2021/0112471 A1 | 4/2021 | Xu et al. | |
| 2022/0104089 A1 | 3/2022 | Chang et al. | |
| 2022/0201573 A1 * | 6/2022 | Tsuboi | H04W 36/0079 |
| 2022/0386201 A1 * | 12/2022 | Hori | H04W 36/08 |

FOREIGN PATENT DOCUMENTS

| | | | |
|---|---|---|---|
| EP | 3537765 A1 | 9/2019 | |
| JP | 2021019221 A * | 2/2021 | H04W 28/06 |
| JP | 2021019221 A | 2/2021 | |
| JP | 2021019222 A * | 2/2021 | H04W 36/0061 |
| JP | 6906020 B2 | 7/2021 | |
| JP | 7403988 B2 * | 12/2023 | H04W 36/08 |
| WO | 2016090124 A1 | 6/2016 | |
| WO | 2018026401 A1 | 2/2018 | |
| WO | WO-2020048479 A1 * | 3/2020 | H04W 36/18 |

OTHER PUBLICATIONS

International Preliminary Report on Patentability—PCT/US2020/054167, The International Bureau of WIPO—Geneva, Switzerland, dated Apr. 14, 2022.

International Search Report and Written Opinion—PCT/US2020/054167—ISA/EPO—dated Jan. 19, 2021.

RAN3: "LS on Enhanced Make-Before-Break Data Forwarding", 3GPP Draft; R2-1912034_R3-194768, 3rd Generation Partnership-Project (3GPP), Mobile Competence Centre; 650, Route Des Lucioles; F-06921 Sophia-Antipolis Cedex; France , vol. RAN WG2, No. Chongqing, China; Oct. 14, 2019-Oct. 18, 2019, Sep. 29, 2019 (Sep. 29, 2019), 1 Page, XP051803563, p. 1, line 20-line 23.

VIVO: "Issues on the PDCP Packet Reception", 3GPP TSG-RAN WG2 Meeting #99, 3GPP Draft; R2-1708504 Issues on the PDCP Packet Reception, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), 9 Pages, XP051318359, p. 5.

* cited by examiner

MAKE-BEFORE-BREAK (MBB) HANDOVER OPERATIONS

CROSS-REFERENCE TO RELATED APPLICATION(S)

This application claims is a continuation of U.S. Non Provisional patent application Ser. No. 17/062,194, filed Oct. 2, 2020, which claims benefit of and priority to U.S. Provisional Patent Application Ser. No. 62/910,303, filed Oct. 3, 2019, herein incorporated by reference in its entirety as if fully set forth below and for all applicable purposes.

BACKGROUND

Field of the Disclosure

Aspects of the present disclosure relate to wireless communications, and more particularly, to make-before-break (MBB) handover operations for achieving little to no interruption time in dual connectivity (DC) scenarios.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5GNB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects relate to a method of wireless communication performed by a user equipment (UE). The method includes indicating, to a source network entity, a make-before-break (MBB) handover capability of the UE, the MBB handover capability supporting MBB handovers for one or more data radio bearers (DRBs) identified by the source network entity. The method includes receiving, from the source network entity, configuration information for a handover from the source network entity to a target network entity, the configuration information identifying the one or more DRBs to be supported for the MBB handover. The method includes determining to support the MBB handover if the configuration information identifies at least one MBB DRB. The method includes participating in the MBB handover according to the configuration information by continuing to maintain a connection with the source network entity and continuing to communicate data with the source network entity via the at least one MBB DRB while establishing a connection with the target network entity until a connection with the source network entity is released.

Certain aspects relate to a user equipment (UE), comprising a memory; and a processor communicatively coupled to the memory. The processor and the memory are configured to indicate a make-before-break (MBB) handover capability of the UE, the MBB handover capability supporting MBB handovers for one or more data radio bearers (DRBs) identified by a source network entity. The processor and the memory are configured to receive, from the source network entity, configuration information for a handover from the source network entity to a target network entity, the configuration information identifying the one or more DRBs supported for the MBB handover. The processor and the memory are configured to determine to support the MBB handover if the configuration information identifies at least one MBB DRB. The processor and the memory are configured to participate in the MBB handover according to the configuration information by continuing to maintain a connection with the source network entity and continuing to communicate data with the source network entity via the at least one MBB DRB while establishing a connection with the target network entity until a connection with the source network entity is released.

Certain aspects relate to a user equipment (UE). The UE includes means for indicating, to a source network entity, a make-before-break (MBB) handover capability of the UE, the MBB handover capability supporting MBB handovers for one or more data radio bearers (DRBs) identified by the source network entity. The UE includes means for receiving, from the source network entity, configuration information for a handover from the source network entity to a target network entity, the configuration information identifying the one or more DRBs to be supported for the MBB handover. The UE includes means for determining to support the MBB handover if the configuration information identifies at least one MBB DRB. The UE includes means for participating in the MBB handover according to the configuration information by continuing to maintain a connection with the source network entity and continuing to communicate data with the source network entity via the at least one MBB DRB while establishing a connection with the target network entity until a connection with the source network entity is released.

Certain aspects relate to a non-transitory computer-readable storage medium that stores instructions that when executed by a processor of a user equipment (UE) cause the UE to perform a method for wireless communication. The method includes indicating, to a source network entity, a make-before-break (MBB) handover capability of the UE, the MBB handover capability supporting MBB handovers for one or more data radio bearers (DRBs) identified by the source network entity. The method includes receiving, from the source network entity, configuration information for a handover from the source network entity to a target network entity, the configuration information identifying the one or more DRBs to be supported for the MBB handover. The method includes determining to support the MBB handover if the configuration information identifies at least one MBB DRB. The method includes participating in the MBB handover according to the configuration information by continuing to maintain a connection with the source network entity and continuing to communicate data with the source network entity via the at least one MBB DRB while establishing a connection with the target network entity until a connection with the source network entity is released.

Certain aspects relate to a method of wireless communication performed by a source network entity. The method includes receiving, from a user equipment (UE), a make-before-break (MBB) handover capability of the UE, the MBB handover capability supporting MBB handovers for one or more data radio bearers (DRBs) identified by the source network entity. The method includes transmitting configuration information for the MBB handover to the UE, the configuration information identifying the one or more DRBs supported for the MBB handover. The method includes participating in the MBB handover according to the configuration information by continuing to maintain a connection with the UE and continuing to communicate data with the UE via the one or more DRBs supported for the MBB handover while the UE establishes a connection with a target network entity until a connection with the UE is released.

Certain aspects relate to a source network entity, comprising a memory and a processor communicatively coupled to the memory. The processor and the memory are configured to receive, from a user equipment (UE), a make-before-break (MBB) handover capability of the UE, the MBB handover capability supporting MBB handovers for one or more data radio bearers (DRBs) identified by the source network entity. The processor and the memory are configured to transmit configuration information for the MBB handover to the UE, the configuration information identifying the one or more DRBs supported for the MBB handover. The processor and the memory are configured to participate in the MBB handover according to the configuration information by continuing to maintain a connection with the UE and continuing to communicate data with the UE via the one or more DRBs supported for the MBB handover while the UE establishes a connection with a target network entity until a connection with the UE is released.

Certain aspects relate to a source network entity. The source network entity includes means for receiving, from a user equipment (UE), a make-before-break (MBB) handover capability of the UE, the MBB handover capability supporting MBB handovers for one or more data radio bearers (DRBs) identified by the source network entity. The source network entity includes means for transmitting configuration information for the MBB handover to the UE, the configuration information identifying the one or more DRBs supported for the MBB handover. The source network entity includes means for participating in the MBB handover according to the configuration information by continuing to maintain a connection with the UE and continuing to communicate data with the UE via the one or more DRBs supported for the MBB handover while the UE establishes a connection with a target network entity until a connection with the UE is released.

Certain aspects relate to a non-transitory computer-readable storage medium that stores instructions that when executed by a processor of a source network entity cause the source network entity to perform a method for wireless communication. The method includes receiving, from a user equipment (UE), a make-before-break (MBB) handover capability of the UE, the MBB handover capability supporting MBB handovers for one or more data radio bearers (DRBs) identified by the source network entity. The method includes transmitting configuration information for the MBB handover to the UE, the configuration information identifying the one or more DRBs supported for the MBB handover. The method includes participating in the MBB handover according to the configuration information by continuing to maintain a connection with the UE and continuing to communicate data with the UE via the one or more DRBs supported for the MBB handover while the UE establishes a connection with a target network entity until a connection with the UE is released.

Certain aspects relate to a method of wireless communication performed by a target network entity. The method includes receiving, from a source network entity, a set of one or more data radio bearers (DRBs) to be supported for a make-before-break (MBB) handover of a user equipment (UE) from the source network entity to the target network entity. The method includes determining one or more DRBs of the set of one or more DRBs to support for the MBB handover. The method includes sending, to the source network entity, an indication of the determined one or more DRBs the target network entity accepts to support for the MBB handover.

Certain aspects relate to a target network entity, comprising a memory and a processor communicatively coupled to the memory. The processor and the memory are configured to receive, from a source network entity, a set of one or more data radio bearers (DRBs) to be supported for a make-before-break (MBB) handover of a user equipment (UE) from the source network entity to the target network entity.

The processor and the memory are configured to determine one or more DRBs of the set of one or more DRBs to support for the MBB handover. The processor and the memory are configured to send, to the source network entity, an indication of the determined one or more DRBs the target network entity accepts to support for the MBB handover.

Certain aspects relate to a target network entity. The target network entity includes means for receiving, from a source network entity, a set of one or more data radio bearers (DRBs) to be supported for a make-before-break (MBB) handover of a user equipment (UE) from the source network entity to the target network entity. The target network entity includes means for determining one or more DRBs of the set of one or more DRBs to support for the MBB handover. The target network entity includes means for sending, to the source network entity, an indication of the determined one or more DRBs the target network entity accepts to support for the MBB handover.

Certain aspects relate to a non-transitory computer-readable storage medium that stores instructions that when executed by a processor of a target network entity cause the target network entity to perform a method for wireless communication. The method includes receiving, from a source network entity, a set of one or more data radio bearers (DRBs) to be supported for a make-before-break (MBB) handover of a user equipment (UE) from the source network entity to the target network entity. The method includes determining one or more DRBs of the set of one or more DRBs to support for the MBB handover. The method includes sending, to the source network entity, an indication of the determined one or more DRBs the target network entity accepts to support for the MBB handover.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
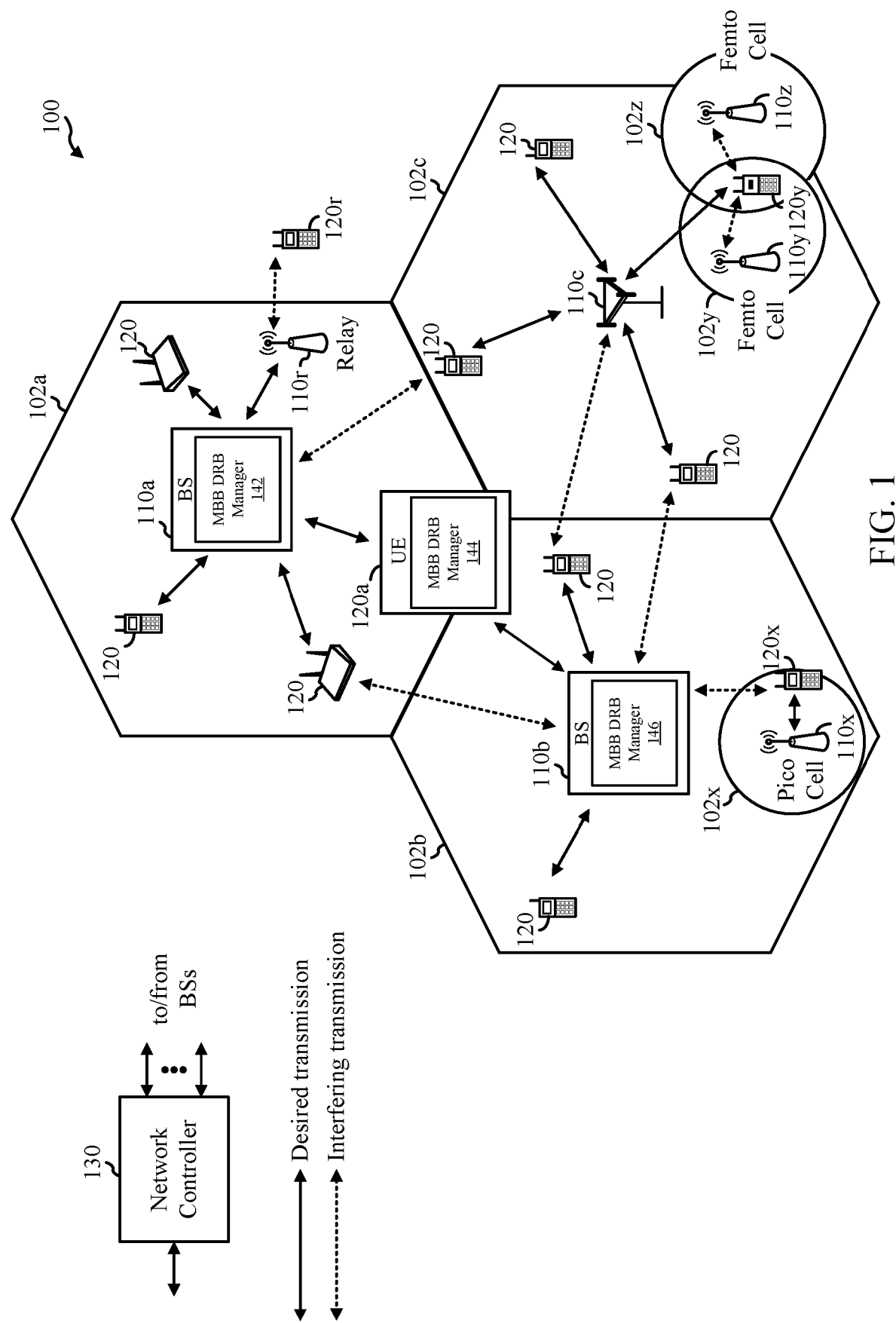
FIG. 1 is a block diagram conceptually illustrating an example telecommunications system, in accordance with certain aspects of the present disclosure.

Aspects of the present disclosure provide apparatus, methods, processing systems, and computer readable mediums for handling for achieving little to no interruption time in handover operations.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown in FIG. 1, the UE 120a includes a make-before-break (MBB) data radio bearer (DRB) manager 144 that may be configured for indicating, by the UE 120 to a source network entity (e.g., a first base station 110a), a make-before-break (MBB) handover capability of the UE 120a. In some examples, the MBB handover capability supports MBB handovers for one or more DRBs identified by the first BS 110a. The MBB DRB manager 144 may be configured to receive, from the first BS 110a, configuration information for a handover from the first BS 110a to a target network entity (e.g., a second BS 110b). In some examples, the configuration information identifies the one or more DRBs supported by the first BS 110a and the second BS 110b for the MBB handover. The MBB DRB manager 144 may also be configured to determine to support the MBB handover if the configuration information identifies at least one MBB DRB (e.g., if the configuration information supports an MBB handover with at least one DRB). The MBB DRB manager 144 may also support participating in the MBB handover according to the configuration information by continuing to maintain a connection with the first BS 110a and continuing to communicate data with the source BS via the at least one MBB DRB while establishing a connection with the target BS 110b until a connection with the first BS 110a is released.

The first BS 110a may also include an MBB DRB manager 142 configured for receiving, from the UE 120a, a MBB handover capability of the UE. In some examples, the MBB handover capability supporting an MBB handover for one or more DRBs identified by the first BS 110a. The MBB DRB manager 142 may be configured to transmit configuration information for the MBB handover to the UE, the configuration information identifying the one or more DRBs supported for the MBB handover. The MBB DRB manager 142 may also be configured to support participating in the MBB handover according to the configuration information by continuing to maintain a connection with the UE and continuing to communicate data with the UE via the one or more DRBs supported for the MBB handover while the UE establishes a connection with the second BS 110b until a connection with the UE is released.

The second BS 110b may also include an MBB DRB manager 146 configured for receiving, from the first BS 110a, a set of one or more DRBs to be supported for an MBB handover of the UE 120a from the first BS 110a to the second BS 110b. The MBB DRB manager 146 may also be configured to support sending, to the first BS 110a, an indication of one or more of the set of DRBs the second BS 110b accepts to support for MBB with the UE 120a.

It should be noted that although FIG. 1 illustrates the first BS 110a and the second BS 110b as separate BSs, the foregoing description of the respective MBB DRB managers may also support MBB handovers between the UE 120a and a single one of the BSs. For example, the MBB handover operations as described may be implemented during a handover between multiple serving cells in a carrier aggregation (CA) scenario of a single BS (e.g., BS 110a). That is, an MBB DRB manager 142/146 of a BS may support MBB handover with the UE 120a from, for example, a primary cell (Pcell) of the BS to a secondary cell (Scell) of the BS.

As illustrated in FIG. 1, the wireless communication network 100 includes a number of base stations (BSs) 110 and other network entities. ABS may be a station that communicates with UEs 120. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
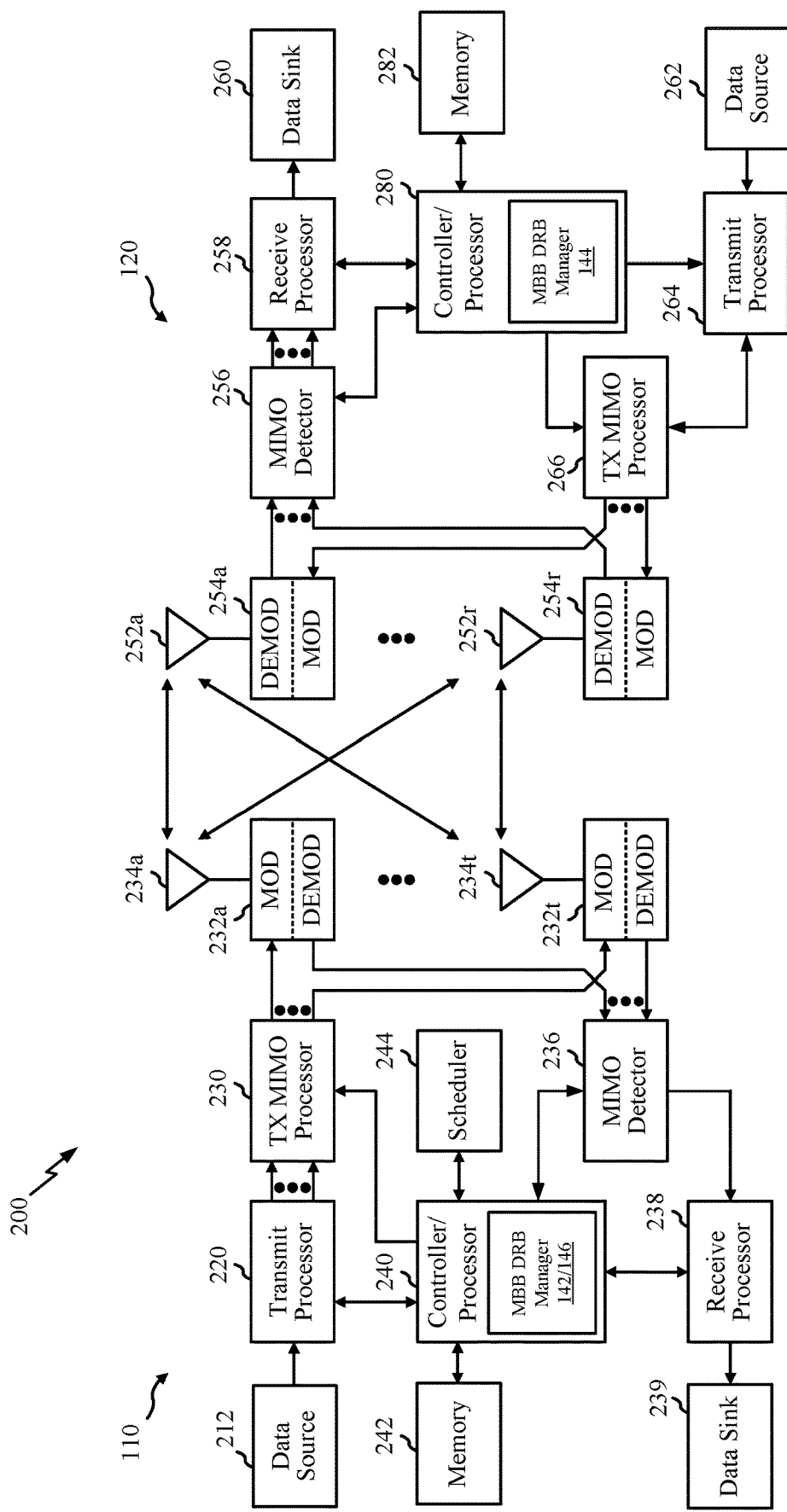
FIG. 2 is a block diagram conceptually illustrating a design of an example base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

As shown in FIG. 2, the UE 120 includes a make-before-break (MBB) data radio bearer (DRB) manager 144 that may be configured for indicating, by the UE 120 to a source network entity (e.g., a base station 110), a make-before-break (MBB) handover capability of the UE 120. In some examples, the MBB handover capability supports an MBB handover for one or more DRBs identified by the first BS 110. The MBB DRB manager 144 may be configured to receive, from the first BS 110, configuration information for a handover from the first BS 110 to a target network entity (e.g., a second BS 110). In some examples, the configuration information identifies the one or more DRBs supported by the first BS 110 and the second BS 110 for the MBB handover. The MBB DRB manager 144 may also be configured to determine to support the MBB handover if the configuration information identifies at least one MBB DRB (e.g., if the configuration information supports an MBB handover with at least one DRB). The MBB DRB manager 144 may also support participating in the MBB handover according to the configuration information by continuing to maintain a connection with the first BS 110 and continuing to communicate data with the source BS via the at least one MBB DRB while establishing a connection with the target BS 110 until a connection with the first BS 110 is released.

FIG. 2 also illustrates a BS 110 may also include the MBB DRB manager 142/146 of FIG. 1. As described in FIG. 1, the MBB DRB manager 142/146 may be configured for receiving, from the UE 120, a MBB handover capability of the UE 120. In some examples, the MBB handover capability supporting an MBB handover for one or more DRBs identified by the BS 110. The MBB DRB manager 142 may be configured to transmit configuration information for the MBB handover to the UE 120, the configuration information identifying the one or more DRBs supported for the MBB handover. The MBB DRB manager 142/146 may also be configured to support participating in the MBB handover according to the configuration information by continuing to maintain a connection with the UE 120 and continuing to communicate data with the UE 120 via the one or more DRBs supported for the MBB handover while the UE 120 establishes a connection with another BS until a connection with the UE 120 is released.

The MBB DRB manager 142/146 of the BS 110 may also be configured for receiving, from another BS (e.g., a source BS), a set of one or more DRBs to be supported for an MBB handover of the UE 120 from the other BS to the BS 110. The MBB DRB manager 146 may also be configured to support sending, to the other BS, an indication of one or more of the set of DRBs the BS 110 accepts to support for MBB with the UE 120a.

It should be noted that although FIG. 1 illustrates the first BS 110a and the second BS 110b as separate BSs, the foregoing description of the respective MBB DRB managers may also support an MBB handover between the UE 120a and a single one of the BSs. For example, the MBB handover operations as described may be implemented during a handover between multiple serving cells in a carrier aggregation (CA) scenario of a single BS (e.g., BS 110a). That is, an MBB DRB manager 142/146 of a BS may support MBB handover with the UE 120a from, for example, a primary cell (Pcell) of the BS to a secondary cell (Scell) of the BS.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Handover Scenarios

Some techniques and apparatuses described herein provide for low-latency or zero-latency handover from a source BS to a target base station (e.g., in a network such as a 4G/LTE or 5G/NR network). For example, some techniques and apparatuses described herein provide for configuration of the handover using a first protocol stack of the UE and a second protocol stack of the UE, wherein the first protocol stack is used for communication with the first BS and the second protocol stack is used for communication with the second BS. The use of the two protocol stacks may enable configuration of handover with regard to the target BS to be performed while communication with the source BS is ongoing. Thus, a latency associated with handing over the UE from the source base station to the target base station is reduced. Furthermore, some techniques and apparatuses described herein may provide for buffering and backhauling of UE traffic between the source BS and the target BS so that a flow of traffic to the UE is not interrupted (or so that interruption is reduced or minimized), thereby further reducing latency associated with handing over the UE. In this way, service levels at the UE may be satisfied in the case of handover of the UE, which allows for satisfaction of performance requirements for certain types of traffic (e.g., gaming traffic, multimedia traffic, high-reliability traffic, low-latency traffic, etc.).

Furthermore, some techniques and apparatuses described herein may provide a common packet data convergence protocol (PDCP) function for the make-before-break (MBB) handover procedure, which may streamline security key management, ciphering/deciphering, integrity protection, integrity verification, data unit reordering/duplicate discarding, link selection logic, and/or the like. Some techniques and apparatuses described herein provide control-plane (e.g., BS, network controller, control entity, etc.) messaging and handling to support the MBB handover. Some techniques and apparatuses described herein provide for an MBB handover using a carrier aggregation (CA) multiple-input multiple-output (MIMO) technique, wherein a diminished MIMO configuration is signaled to cause at least one antenna to be available for use for the MBB handover. Still further, some techniques and apparatuses described herein provide a role switch-based MBB handover technique, wherein a master cell group of the UE is switched from the source base station to the target base station while connections with the source base station and the target base station are active. In this way, low-latency or zero-latency handover (and the benefits described above in connection with low-latency or zero-latency handover) are realized.

Figure 3:
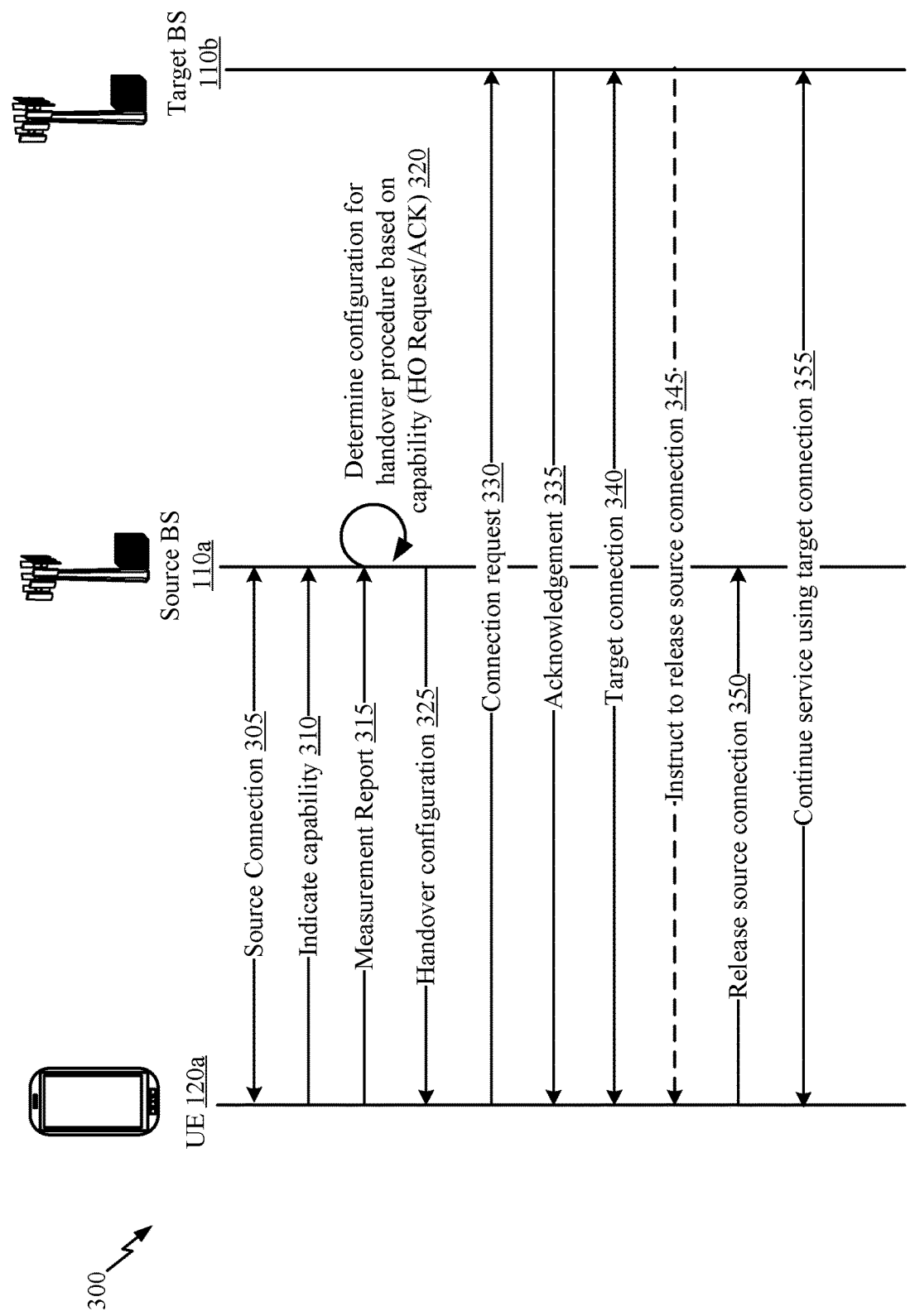
FIGS. 3 and 4 is a call-flow diagram illustrating examples of determining a handover configuration for a handover procedure of a radio access network, in accordance with certain aspects of the present disclosure.

FIG. 3 is a call-flow diagram illustrating an example 300 of determining a handover configuration for a handover procedure of a radio access network, in accordance with various aspects of the present disclosure. As shown in FIG. 3, a UE (e.g., UE 120a of FIGS. 1 and 2) is handed over from a source BS (e.g., BS 110a of FIG. 1) to a target BS (e.g., BS 110b of FIG. 1). It should be noted that although FIG. 3 illustrates the source BS 110a and the target BS 110b as separate BSs, the foregoing description of the respective MBB DRB managers may also support an MBB handover operation between the UE 120a and a single one of the BSs. For example, the MBB handover operations as described may be implemented during a handover between multiple serving cells in a carrier aggregation (CA) scenario of a single BS (e.g., BS 110a/110b). That is, the examples handover procedures described may be performed with a UE 120a from, for example, a primary cell (Pcell) of the BS to a secondary cell (Scell) of the same BS.

As shown in FIG. 3, at a first communication 305, UE 120 may establish a wireless communication connection with the source BS 110a (hereinafter referred to as a source connection). At a second communication 310, the UE 120 may indicate a capability of UE 120 to any one or more of source BS 110a, target BS 110b, or another a network entity such as an access and mobility management function (AMF), user plane function (UPF), or any other CN function. For example, in the second communication 310, the UE 120 may indicate that UE 120 has a simultaneous transmit and receive capability and/or a dual connectivity capability.

In a third communication 315, UE 120 may provide a measurement report to source BS 110a. The measurement report may be generated by the UE 120, and may indicate to the source BS 110*a* that a handover is to be performed from the source BS 110*a* to the target BS 110*b*. For example, the UE 120 may perform cell quality measurements (e.g., L3 cell quality measurements) to assess the quality of radio links between the UE 120 and one or more of the source BS 110*a* and the target BS 110*b*. Accordingly, the measurement report may include the results of the cell quality measurements. In some examples, if the quality of the radio link between the UE 120 and the source BS 110*a* is sufficient to allow for successful uplink communication of the measurement report, then successful receipt of the measurement report at the source BS 110*a* may indicate to the source BS 110*a* that a handover is to be performed from the source BS 110*a* to the target BS 110*b*.

At step 320 (assuming successful receipt of the measurement report of the third communication 315), the source BS 110*a* may determine a configuration for a handover procedure based at least in part on the capability indicated in the second communication 310. For example, source BS 110*a* may provide a handover request to target BS 110*b*, and may receive a handover acknowledgment (ACK) from target BS 110*b*. In some aspects, source BS 110*a* may communicate with target BS 110*b* to determine a handover configuration for UE 120.

In a fourth communication 325, the source BS 110*a* may provide the configuration for the handover procedure to the UE 120. For example, the handover configuration may include a configuration for a handover procedure that utilizes or does not utilize the indicated capability of the UE 120. In some aspects, the handover configuration may indicate that a make-before-break (MBB) handover procedure and/or a DC-based MBB handover procedure be performed. Thus, the configuration may indicate to the UE 120 whether to maintain the radio link connection to the source BS 110*a* while, and/or after, a radio link connection to the target BS 110*b* is established.

In a fifth communication 330, UE 120 requests to connect with target BS 110*b* (e.g., using the configuration received from source BS 110*a*). For example, UE 120 may perform a random access procedure to establish a connection with target BS 110*b* (hereinafter referred to as a target connection).

In response, the target BS 110*b* may reply with an acknowledgment in a sixth communication 335. The UE 120 and target BS 110*b* may then establish the target connection 340. As is evident in the example 300 illustrated in FIG. 3, UE 120 may concurrently maintain both a source connection with source BS 110*a* and target BS 110*b* during the handover process. In such cases, because UE 120 maintains an active connection with both source BS 110*a* and target BS 110*b* for a period of time, UE 120 may experience decreased delays relative to previous techniques and/or minimal data interruption time (e.g., 0 ms handover).

In a seventh communication 345, the target BS 110*b* may instruct the UE 120 to release the source connection between the UE 120 and the source BS 110*a* to complete the handover. For example, once the UE 120 and/or target BS 110*b* determines that the target connection is sufficiently strong (e.g., a communication parameter measured by the UE 120 and/or target BS 110*b* satisfies a first threshold indicative of a strong connection), target BS 110*b* may send the instruction to complete the handover.

In some aspects, the release of the source connection may not be based on an instruction from target BS 110*b*. Instead, the UE 120 may release the source connection without instruction from target BS 110*b* based at least in part on the establishment of the target connection (e.g., the UE 120 determines that the communication parameter measured by the UE 120 satisfies the first threshold indicative of a strong target connection). In some aspects, the UE 120 may release the source connection based on an instruction from the source BS 110*a*. In such an example, the instruction may be based at least in part on receiving, by the source BS 110*a*, an indication of establishment of the target connection from the target BS 110*b* or from the UE 120.

In an eighth communication 350, the UE 120 may release the source connection to source BS 110*a*. Additional communications 355 between the UE 120 and the target BS 110*b* may be made using the target connection.

Accordingly, as shown by example 300 in FIG. 3, a UE may provide a capability to a BS or network entity and the BS may configure an MBB handover procedure for the UE to enable the UE to use the capability during the handover procedure. Therefore, a UE may achieve enhanced performance during a handover procedure and may experience minimal mobility interruption time (e.g., via a 0 ms handover) relative to a handover procedure that does not account for, or take advantage of, the MBB capability of the UE. As indicated above, FIG. 3 is provided as an example. Other examples may differ from what is described with respect to FIG. 3.

Figure 4:
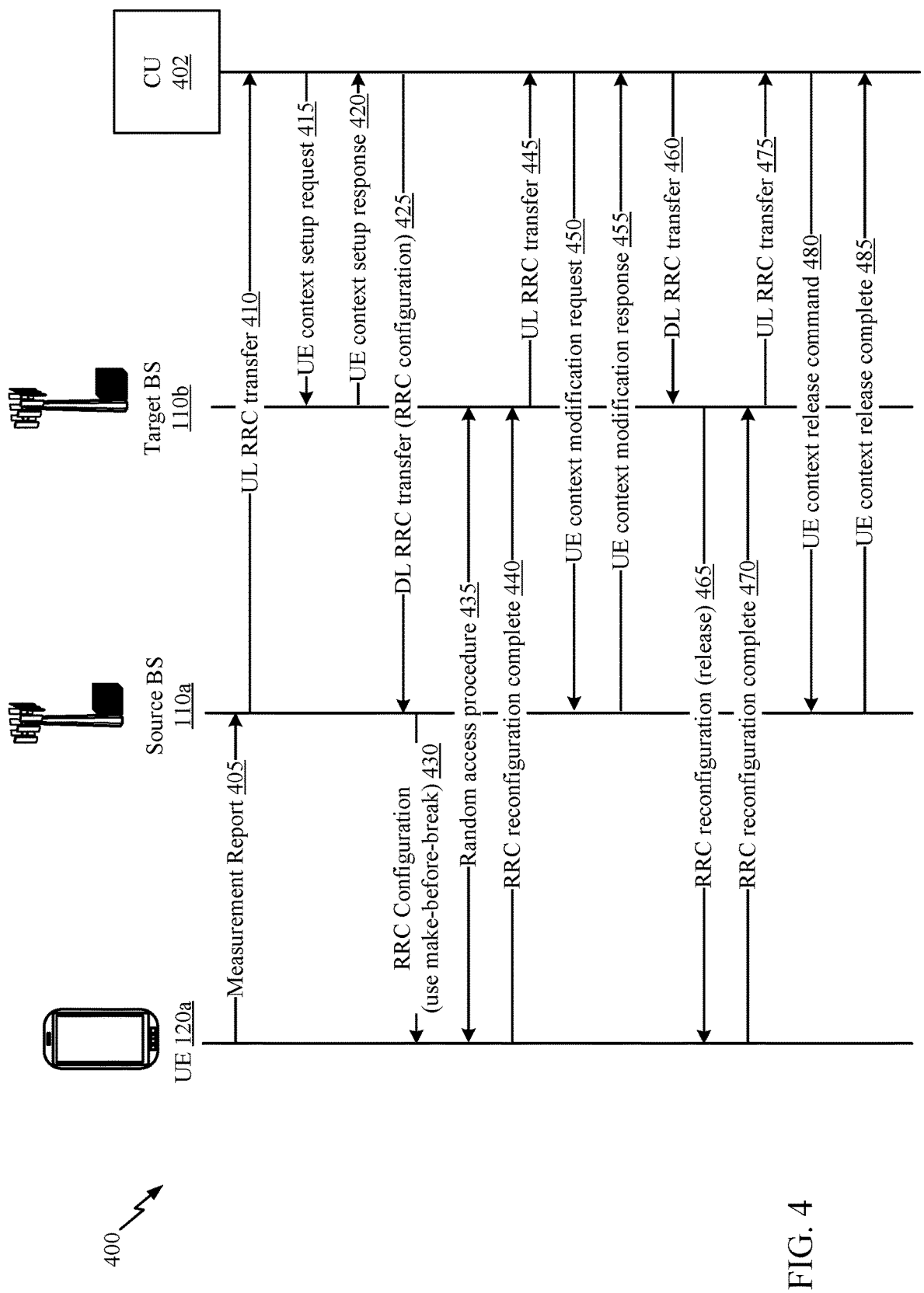

FIG. 4 is a call-flow diagram illustrating an example 400 of determining a handover configuration for a handover procedure of a RAN, in accordance with various aspects of the present disclosure. More particularly, FIG. 4 illustrates an example intra-CU handover procedure using an enhanced MBB handover in which both a source BS 110*a* and a target BS 110*b* are associated with a same CU 402.

Prior to the beginning of the call flow, the UE 120 may exchange user data (e.g., uplink user data from the UE 120 over PUSCH, and/or downlink user data over received by the UE over PDSCH) with the CU 402 via source BS 110*a*. In a first communication 405, the UE 120 may transmit a measurement report to the source BS 110*a*.

The generation and transmission of the measurement report of FIG. 4 may include features of the measurement report described in FIG. 4. In some aspects, the UE 120 may generate and transmit the measurement report based at least in part on an event trigger (e.g., a signal measurement that satisfies a threshold) associated with determining that a handover procedure is to be initiated. For example, the execution criteria for conditional SN addition may involve inter-RAT measurement events configured to indicate whether one or more of: (i) a measured signal quality value of at least one inter-RAT neighbor is greater than a first threshold value (e.g., the signal is sufficiently strong), or (ii) a measured signal quality value of a PCell is less than the first threshold value, and the measured signal quality value of the at least one inter-RAT neighbor (e.g., another BS or PCell at the current BS) is greater than a second threshold value.

In some examples, the UE 120 includes a simultaneous transmit and receive capability (e.g., MBB capability) that allows UE 120 to concurrently transmit and receive data and/or information during a handover. In such a case, UE 120 may establish and maintain a plurality of connections with a plurality of different BSs (e.g., with source BS 110*a* and target BS 110*b*).

In a second communication 410, source BS 110*a* may send an uplink (UL) radio resource control (RRC) transfer to CU 402. In some aspects, the UL RRC transfer may include the measurement report. In an additional aspect, the UL RRC transfer may cause CU 402 to determine a handover configuration that is to be used for a handover procedure for UE 120. For example, CU 402 may select from possible handover procedures that may be performed by UE 120 based at least in part on the indicated capability of UE 120. In some aspects, CU 402 may select an enhanced MBB handover procedure for UE 120 based at least in part on the UE's 120 indication of a simultaneous transmit and receive capability.

In a third communication 415, the CU 402 may transmit a UE context setup request to target BS 110*b*. In some examples, the CU 402 may transmit the UE context setup request, in part, to indicate to target BS 110*b* that UE 120 will be handed over to target BS 110*b* during a handover procedure.

In a fourth communication 420, target BS 110*b* may respond to the third communication 415 by transmitting a UE context setup response. The target BS 110*b* may send the UE context setup response to acknowledge the third communication 415 and/or to indicate an ability to support the handover procedure and to serve the UE 120 after the handover procedure.

In a fifth communication 425, the CU 402 may transmit a downlink (DL) RRC transfer to the source BS 110*a* in response to receiving the fourth communication 420. In some aspects, the DL RRC transfer may include an RRC reconfiguration message that indicates a configuration for a handover procedure in which UE 120 is to be handed over from source BS 110*a* to target BS 110*b*.

In a sixth communication 430, the source BS 110*a* sends an RRC reconfiguration to UE 120 in response to receiving the fifth communication 425. In some aspects, the RRC reconfiguration can include information identifying target BS 110*b*, information identifying a handover configuration, and/or any other suitable information. In some examples, the RRC reconfiguration may include information indicating that the UE 120 is to perform an enhanced MBB handover procedure with target BS 110*b* using a simultaneous transmit and receive capability of UE 120. In such a case, the UE 120 may determine that it is capable of maintaining a connection with source BS 110*a* while establishing a connection with target BS 110*b*.

In a seventh communication 435, the UE 120 may perform a random access procedure with target BS 110*b* (e.g., to initiate and/or to establish a connection with target BS 110*b*). In some aspects, UE 120 may continue to exchange user data (e.g., uplink user data and/or downlink user data) with CU 402 via source BS 110*a* during and after the random access procedure.

In an eighth communication 440, UE 120 transmits an RRC reconfiguration complete message to target BS 110*b*. In some aspects, UE 120 may use a dual protocol stack, which includes a source protocol stack for communicating with source BS 110*a* and a target protocol stack for communicating with target BS 110*b*. Each of these protocol stacks may include a packet data convergence protocol (PDCP) layer, a radio link control (RLC) layer, a medium access control (MAC) layer, and/or a physical (PHY) layer. In some aspects, the source protocol stack and the target protocol stack may share one or more layers, such as a common PDCP layer or entity. In some aspects, the UE 120 may use the target protocol stack for uplink data transmissions.

In a ninth communication 445, target BS 110*b* may transmit a UL RRC transfer to CU 402 in response to the eighth communication 440. In some examples, the UL RRC transfer may indicate the RRC reconfiguration is complete. Accordingly, in some aspects, based at least in part on receiving the indication that the RRC reconfiguration is complete, CU 402 may determine a handover completion configuration. For example, when making a completion determination, CU 402 may utilize and/or configure one or more thresholds for one or more measurement parameters to perform a handover completion procedure (e.g., to release source BS 110*a*). Furthermore, in some aspects, after the RRC reconfiguration is complete, UE 120 may perform uplink user/control plane duplication with source BS 110*a* and CU 402. For example, control plane data may be duplicated and shared between BS 110*a* and CU 402. Furthermore, in some aspects, after the CU 402 determines the RRC reconfiguration is complete, the CU 402 may send downlink user data to the UE 120 via target BS 110*b*, while also continuing to send downlink user/control plane duplication to the UE 120 via source BS 110*a*. Accordingly, UE 120 may achieve improved reliability when receiving the data on the downlink.

In a tenth communication 450, the CU 402 transmits a UE context modification request to the source BS 110*a*. The UE context modification request may include a transmission stop indicator to indicate that source BS 110*a* is to be released from serving UE 120 (e.g., release of a radio link between the source BS 110*a* and the UE 120). In some examples, the source BS 110*a* may provide a downlink data delivery status to CU 402 indicating status of downlink user/control plane duplication the source BS 110*a* is communicating to the UE 120.

In an eleventh communication 455, source BS 110*a* may transmit a UE context modification response to CU 402 in response to the tenth communication 450. For example, the UE context modification response may include an acknowledgement that source BS 110*a* is to be released during the handover procedure and/or is to no longer serve UE 120.

In a twelfth communication 460, the CU 402 may transmit a DL RRC transfer to the target BS 110*b*. The DL RRC transfer may include an RRC reconfiguration message indicating that a handover procedure from the source BS 110*a* to the target BS 110*b* is to be performed.

In a thirteenth communication 465, the target BS 110*b* may transmit an RRC reconfiguration to UE 120. In some examples, the RRC reconfiguration message may indicate that UE 120 is to release a connection with the source BS 110*a*. As such, UE 120 may release the connection with the source BS 110*a* based at least in part on receiving the RRC reconfiguration message. Furthermore, UE 120 may then begin exchanging uplink user data and downlink user data with CU 402 via target BS 110*b*.

In a fourteenth communication 470, the UE 120 may transmit an RRC reconfiguration complete message to the target BS 110*b*. The RRC reconfiguration complete message may indicate that UE 120 has released the connection with source BS 110*a*.

In a fifteenth communication 475, the target BS 110*b* may transmit a UL RRC transfer to CU 402. In some aspects, the UL RRC transfer may be made in response to the fourteenth communication 470 and may indicate that the RRC reconfiguration complete message was received from UE 120.

In a sixteenth communication 480, the CU 402 may then send a UE context release command to source BS 110*a* (e.g., so that source BS 110*a* does not continue to attempt to serve UE 120).

In a seventeenth communication 485, the source BS 110*a* may transmit a UE context release complete message to CU 402. The UE context release complete message may be an acknowledgement that source BS 110*a* is no longer in communication with and/or serving UE 120.

Examples of Per-DRB MBB Handovers

Aspects of the present disclosure relate to wireless communications, and more particularly, techniques that may help optimize handover operations, such as MBB. In handover procedures, MBB handovers can be utilized to provide a 0 millisecond (ms) interruption time in communications between a UE (e.g., UE 120a of FIGS. 1 and 2) and the one or more BSs (e.g., BS 110a and/or BS 110b of FIG. 1) involved in the handover. Thus, for ultra-reliable low-latency communication (URLLC) services, MBB may be used to achieve zero delay in the data service.

Accordingly, some services (e.g., URLLC) are less tolerant to interruption due to mobility than other services. Thus, if a UE is utilizing multiple services having different latency, reliability, and/or priority requirements, it would be beneficial to provide an MBB handover capability that can be applied on a per-DRB basis so that an interruption-sensitive service communicating over a first DRB can be provided with MBB handover support over relatively less sensitive services. This reduces the overhead necessary for a handover where all DRBs associated with different services are provided with MBB handover support. Moreover, considering that a UE may be limited to providing MBB handover support for only a certain number of DRBs, providing MBB handover support on a per-DRB basis can provide the network (e.g., a BS or network entity) with the ability to consider the maximum number of DRBs that the UE can have configured for MBB support. For example, the network can selectively determine which DRBs are least able to tolerate data interruption, and configure only those DRBs for MBB handover. The remaining DRBs can thus be handled as a traditional handover without MBB. In cases where all DRBs of a UE require reduced or no data interruption during handover, it may be efficient to configure the UE for MBB handover instead of configuring individual DRBs of the UE. Thus, it may be beneficial to keep support for MBB handovers on a per-UE basis (e.g., so that all DRBs are configured for MBB) while optionally using per-DRB support as needed.

Figure 5:
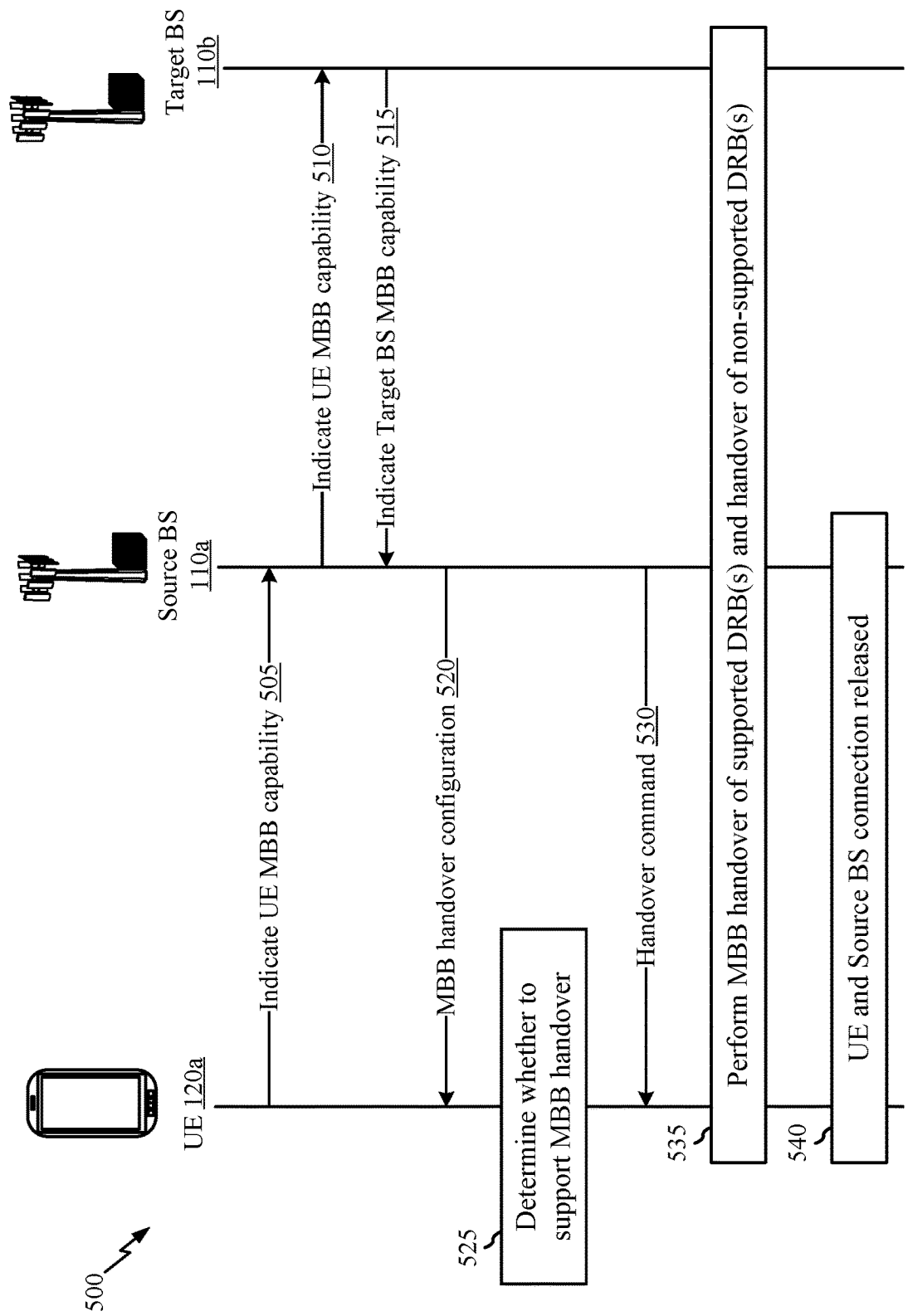
FIG. 5 is a call-flow diagram illustrating example operations for wireless communication by a UE, in accordance with certain aspects of the present disclosure.

FIG. 5 is a call-flow diagram illustrating an example 500 of performing a per-DRB handover, in accordance with various aspects of the present disclosure.

Initially, a UE (e.g., UE 120a of FIGS. 1 and 2) transmits a message 505 to a source BS (e.g., BS 110a of FIG. 1) indicating an MBB handover capability of the UE 120a. In the message 505, the UE 120a may provide information configured to inform the source BS 110a that the UE 120a supports an MBB handover capability that allows the UE 120a to handover one or more DRBs on a per-DRB basis. The message 505 may also include a total number of DRBs supported by the UE 120a in its communication with the source BS 110a, the QoS requirements associated with of one or more DRBs, and any other suitable information.

As discussed, the UE 120a may be capable of only supporting a finite number of DRBs for MBB handovers. As such, the message 505 may include in indication of the maximum number of MBB DRBs supported by the UE 120a. Alternatively, or in addition, the message 505 may include a request for the source BS 110a to consider specific DRBx for a MBB handover. In this example, the UE 120a may determine which DRBs are used to support URLLC services (e.g., which DRBs have a highest QoS requirement), and/or which DRBs have a highest quality of communication (e.g., which DRBs provide a communication path having the least amount of interference based on reference signal received power (RSRP), reference signal received quality (RSRQ), and/or signal to interference & noise ratio (SINR) measurements).

The source BS 110a may receive the message 505 from the UE 120a, and in response to the message 505, determine a set of one or more DRBs that may be configured for MBB handover. For example, the source BS 110a may already know a number of DRBs that the UE 120a is using for communication with the source BS 110a, and may determine which of the known DRBs can be supported based on the information provided in the message 505. In some cases, the source BS 110a may determine to configure the one or more DRBs for MBB handover that were requested by the UE 120a in the message 505.

The source BS 110a may then transmit a second message 510 to the target BS 110b identifying the determined set of one or more DRBs that may be configured for MBB handover of the UE 120a from the source BS 110a to the target BS 110b. The second message 510 may also include any other suitable information provided to the source BS 110a by the UE 120a. For example, the source BS 110a may include a maximum number of DRBs that the UE 120a can support for MBB handover, and/or one or more specific DRBs requested by the UE 120a to consider for MBB handover.

When the target BS 110b receives the second message 510, the target BS 110b may determine one or more DRBs of the set of DRBs to accept for an MBB handover. The determination may be based on the capabilities of the target BS 110b, and/or the information provided to the source BS 110a by the UE 120a. The target BS 110b may then transmit a third message 515 identifying the determined one or more DRBs to the source BS 110a. In one example, the third message 515 may be an acknowledgement (ACK) message confirming receipt of the second message 510. In this example, the ACK message may indicate that the target BS 110b accepts all of the set of DRBs for MBB handover.

In response to receiving the third message 515, the source BS 110a may transmit a fourth message 520 containing configuration information for a handover from the source BS 110a to a target BS 110b. Here, the configuration information identifies the one or more DRBs supported by the source BS 110a and target BS 110b for the MBB handover. Thus, the configuration information may include the information of the third message 515 identifying the one or more DRBs determined by the target BS 110b.

In some examples, the fourth message 520 is a radio resource control (RRC) message. Here, the configuration information may be conveyed in a DRB configuration information element (IE) (e.g., "RadioBearerConfig" IE) present in the RRC message that includes a first field indicating whether MBB handover is supported by the UE 120a, and if it is, whether MBB handover is supported for a particular DRB. In some examples, the DRB configuration IE may be utilized by the source BS 110a to add, modify, or release signaling and/or DRBs of the UE 120a. The DRB configuration IE may include a 1-bit flag (e.g., "make-before-break-ho") that the source BS 110a can set to TRUE for DRBs that need to be configured and supported for MBB handover, and set to FALSE for other DRBs. In some examples, the DRB configuration IE may include another 1-bit flag (e.g., "reestablishPDCP") to indicate to the UE 120a not to reestablish packet data convergence protocol (PDCP) for a DRB supported for MBB handover (e.g., flag is set to FALSE). Conversely, if a particular DRB is not configured for MBB handover, then a "reestablishPDCP" flag corresponding to that particular DRB may be set to TRUE.

That is, the fourth message 520 may indicate to the UE 120*a* which of the UE's 120*a* DRBs are configured for MBB handover, and which of the UE's 120*a* DRBs are not configured for MBB handover. Accordingly, when performing the handover from the source BS 110*a* to the target BS 110*b*, the UE 120*a* may follow MBB handover procedures (e.g., supporting transmitting and receiving data with the source BS 110*a* over MBB supported DRBs while establishing a connection with the target BS 110*b*, and maintaining the data connection over the MBB supported DRBs with the source BS 110*a* until the source connection is released) for the MBB supported DRBs, while following standard handover procedures (e.g., the UE 120*a* may stop data transmission and reception with the source BS 110*a* over non-MBB DRBs after receiving a handover command from the source BS 110*a*, and resume data transmission and reception with the target BS 110*b* over non-MBB DRBs after successful handover to the target BS 110*b*) for the DRBs not supported for MBB.

Upon receiving the fourth message 520, the UE 120*a* may determine, at a first step 525, whether to support an MBB handover. For example, if the configuration information of the fourth message 520 identifies at least one DRB supported for MBB handover, the UE 120*a* may determine to support MBB handover for one or more of the identified DRBs.

In a fifth communication 530, the source BS 110*a* may transmit a handover command to the UE 120*a*. In response, the UE 120*a* may begin a handover 535 from the source BS 110*a* to the target BS 110*b*. That is, the UE 120*a* may participate in the handover 535 according to the configuration information by continuing to maintain a connection with the source BS 110*a* and continuing to communicate data with the source BS 110*a* over the maintained connection via one or more DRBs configured and supported for MBB handover. While maintaining the connection with the BS 110*a*, the UE 120*a* may establish a connection with the target BS 110*b* until the connection with the source BS 110*a* is released.

For example, while participating in the handover 535 after receiving a handover command from the source BS 110*a*, the UE 120*a* may suspend data communication via any DRBs that are not supported for MBB handovers, as indicated in the fourth message 520, after receiving the handover command. However, the UE 120*a* may continue or resume data communication via any of the non-supported DRBs with the target BS 110*b* after a successful handover to the target BS 110*b*. For example, the non-supported DRBs are the DRBs that were identified by the configuration information of the fourth message 520 as not configured or supported for MBB handovers.

Accordingly, for DRBs supported for MBB handover, the source BS 110*a* and the target BS 110*b* may participate in the handover 535 according to the configuration information. For example, the source BS 110*a* may continue to maintain a connection with the UE 120*a* over the MBB supported DRBs, and continue to communicate data with the UE via those DRBs while the UE establishes a connection with the target BS 110*b* and until the source BS 110*a* connection with the UE 120*a* is released. Similarly, the target BS 110*b* may participate in the handover 535 by establishing a connection with the UE 120*a*.

Once the UE 120*a* successfully established a connection with the target BS 110*b*, the source BS 110*a* may release 540 any remaining connections with the UE 120*a*. In some examples, despite the release, the UE 120*a* may store and maintain configuration information for one or more non-MBB supported DRBs with the source BS 110*a* if the handover 535 includes performing an MBB handover for at least one MBB-supported DRB. As discussed below, maintaining configuration information for one or more non-MBB supported DRBs may allow the UE 120*a* to re-establish a connection with the source BS 110*a* if a failure occurs during the handover 535 to the target BS 110*b*.

If, during the handover 535, the UE 120*a* detects a failure of the handover (e.g., timer T304 expiration) or a radio link failure (RLF) on the target BS 110*b* while a connection with at least one MBB DRB is still active between the UE 120*a* and the BS 110*b*, the UE 120 may fallback to data communications with the source BS 110*a*. For example, the UE 120*a* may declare RLF on the target BS 110*b* without triggering an RRC reestablishment. The UE 120*a* may then perform a fallback to the source BS 110*a* and reestablish operation of the non-MBB supported DRBs using the maintained configuration information for one or more non-MBB supported DRBs. The UE 120*a* may also continue operation of the MBB supported DRBs with the source BS 110*a*. The UE 120*a* may then transmit RLF information to the source BS 110*a*, wherein the RLF information includes a cause of the RLF and any available target cell measurement results determined by the UE 120*a*.

In the event that the UE 120*a* detects a failure of the handover or RLF on the target BS 110*b*, and also determines that the source BS 110*a* connection has failed, the UE 120*a* may trigger an RRC reestablishment procedure during the handover 535.

Figure 6:
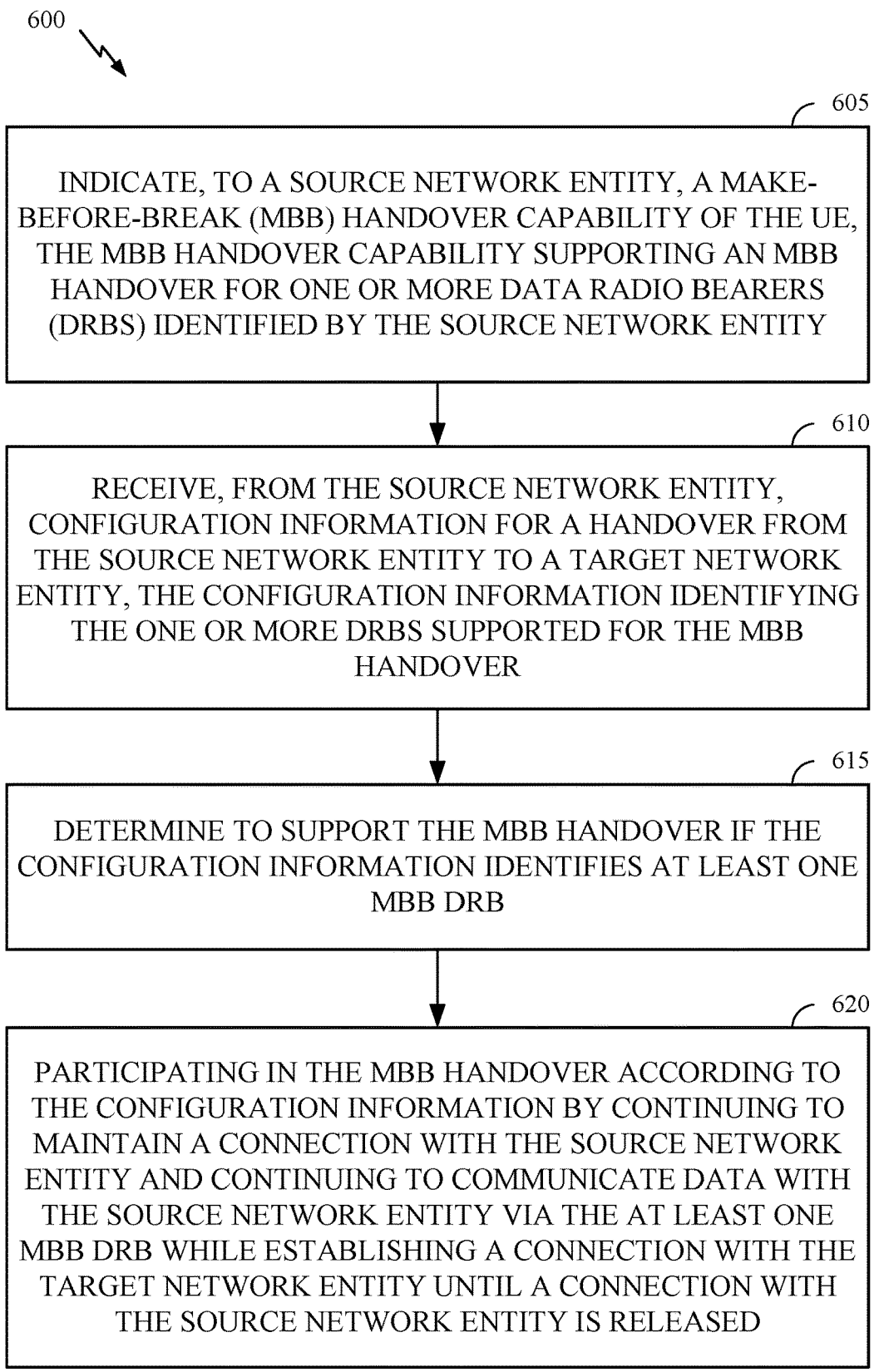
FIG. 6 is a flow diagram illustrating example operations for wireless communication by a UE, in accordance with certain aspects of the present disclosure.

FIG. 6 illustrates example operations 600 that may be performed by a UE (e.g., UE 120*a* of FIGS. 1 and 2) as part of a per-DRB MBB handover, in accordance with certain aspects of the present disclosure. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 600 begin, at step 605, by indicating, to a source network entity, a make-before-break (MBB) handover capability of the UE, the MBB handover capability supporting an MBB handover for one or more data radio bearers (DRBs) identified by the source network entity.

At step 610, the UE receives, from the source network entity, configuration information for a handover from the source network entity to a target network entity, the configuration information identifying the one or more DRBs supported for the MBB handover.

At step 615, the UE determines to support the MBB handover if the configuration information identifies at least one MBB DRB.

At step 620, the UE participates in the MBB handover according to the configuration information by continuing to maintain a connection with the source network entity and continuing to communicate data with the source network entity via the at least one MBB DRB while establishing a connection with the target network entity until a connection with the source network entity is released.

In certain aspects, indicating the MBB handover capability of the UE further comprises providing signaling to the source network entity indicating at least one of: a maximum number of MBB DRBs supported by the UE; and specific DRBs for the MBB handover.

In certain aspects, operations 600 include determining the specific DRBs for the request based on which of the one or more DRBs has a highest quality of service (QoS) relative to another of the one or more DRBs.

In certain aspects, receiving the configuration information further comprises receiving the configuration information via a radio resource control (RRC) message transmitted by the source network entity, wherein the configuration information is conveyed in a DRB configuration information element (IE) present in the RRC message, and wherein the DRB configuration IE comprises a field to indicate whether the MBB handover is supported for a corresponding DRB.

In certain aspects, the DRB configuration IE further comprises a second field for reestablishing packet data convergence protocol (PDCP), and wherein the second field is set to false for the corresponding DRB.

In certain aspects, operations 600 include participating in the MBB handover after receiving a handover command from the source network entity, wherein participating in the MBB handover further comprises: suspending data communication via a non-MBB DRB with the source network after receiving the handover command; and resuming data communication via the non-MBB DRB with the target network entity after a successful handover to the target network entity, wherein the non-MBB DRB is not identified by the configuration information.

In certain aspects, operations 600 include maintaining a source network entity connection configuration for one or more non-MBB DRBs if the UE is performing an MBB handover for at least one MBB DRB.

In certain aspects, operations 600 include, upon detecting a failure of the MBB handover or a radio link failure (RLF) on the target network entity while a connection with at least one MBB DRB is still active, the method further comprises: declaring RLF on the target network entity without triggering a radio resource control (RRC) reestablishment; performing a fallback to the source network entity and operate both non-MBB DRBs and MBB DRBs using the source network entity connection configuration; and sending RLF information to the source network entity, the RLF information comprising a cause of failure and any available target cell measurement results.

In certain aspects, operations 600 include triggering a radio resource control (RRC) reestablishment during the MBB handover only when both a source network entity connection fails and a target network entity connection fails.

Figure 7:
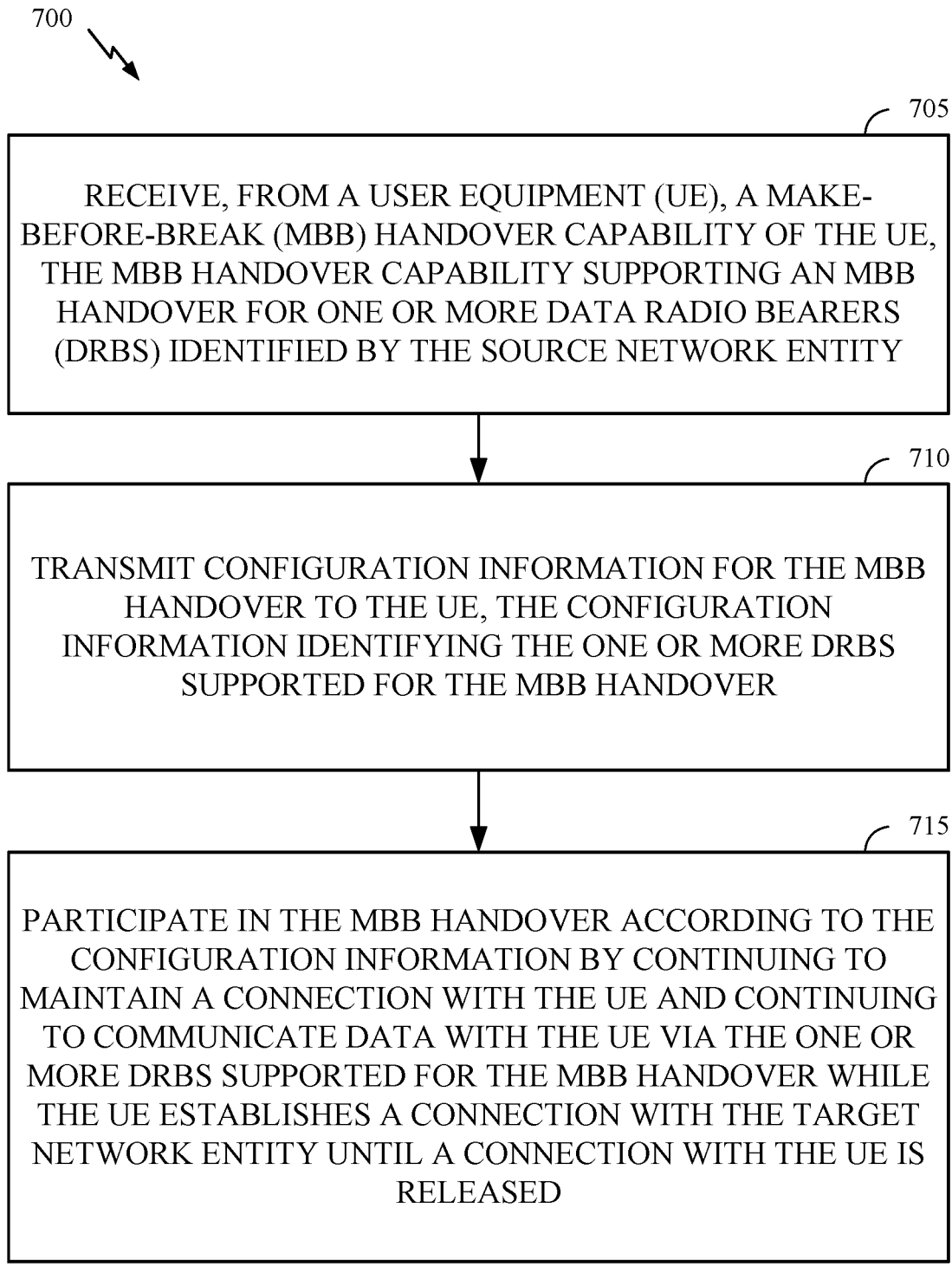
FIG. 7 is a flow diagram illustrating example operations for wireless communication by a source network entity, in accordance with certain aspects of the present disclosure.

FIG. 7 illustrates example operations 700 that may be performed by a network entity (e.g., BS 110*a* of FIG. 1) as part of a per-MBB handover procedure, in accordance with certain aspects of the present disclosure. Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 700 begin, at step 705, by receiving, from a user equipment (UE), a make-before-break (MBB) handover capability of the UE, the MBB handover capability supporting an MBB handover for one or more data radio bearers (DRBs) identified by the source network entity.

At step 710, the BS transmits configuration information for the MBB handover to the UE, the configuration information identifying the one or more DRBs supported for the MBB handover At step 715, the BS participates in the MBB handover according to the configuration information by continuing to maintain a connection with the UE and continuing to communicate data with the UE via the one or more DRBs supported for the MBB handover while the UE establishes a connection with the target network entity until a connection with the UE is released.

In certain aspects, the operations 700 transmitting the target network entity a set of one or more DRBs to be supported for the MBB handover of a user equipment (UE) from the source network entity to the target network entity; receiving, from the target network entity, an indication of one or more of the set of DRBs the target network entity accepts to support for the MBB handover; and including the indication of one or more of the set of DRBs in the configuration information sent to the UE.

In certain aspects, the operations 700 include receiving signaling from the UE or another network entity indicating at least one of: a maximum number of MBB DRBs supported by the UE, or specific DRBs to consider for MBB handover support; and determining which DRBs are to be supported for the MBB handover based, at least in part, on the received signaling.

In certain aspects, the configuration information is conveyed in DRB configuration information elements (IEs) present in the RRC message that include a field to indicate whether MBB handover is supported for a corresponding DRB.

In certain aspects, the DRB configuration IE further comprises a second field for reestablishing packet data convergence protocol (PDCP), and wherein the second field is set to false for the corresponding DRB.

Figure 8:
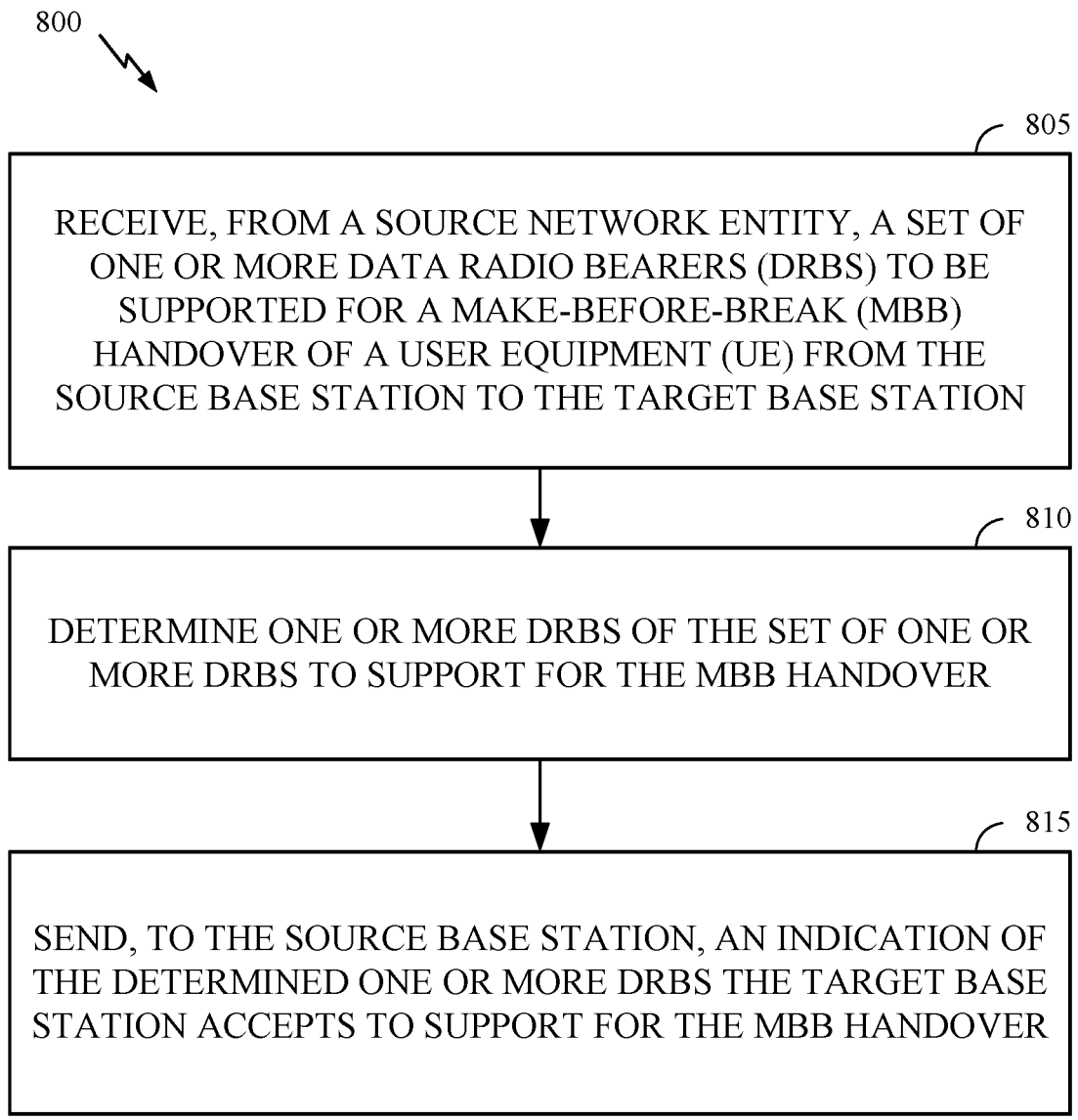
FIG. 8 is a flow diagram illustrating example operations for wireless communication by a target network entity, in accordance with certain aspects of the present disclosure.

FIG. 8 illustrates example operations 800 that may be performed by a network entity (e.g., BS 110*b* of FIG. 1) as part of an MBB handover procedure, in accordance with certain aspects of the present disclosure. Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 800 begin, at step 805 by receiving, from a source network entity, a set of one or more data radio bearers (DRBs) to be supported for a make-before-break (MBB) handover of a user equipment (UE) from the source base station to the target base station.

At step 810, the BS determines one or more DRBs of the set of one or more DRBs to support for the MBB handover.

At step 815, the BS sends, to the source base station, an indication of the determined one or more DRBs the target base station accepts to support for the MBB handover.

In certain aspects, the indication is sent to the source base station in a handover acknowledgment message.

Figure 9:
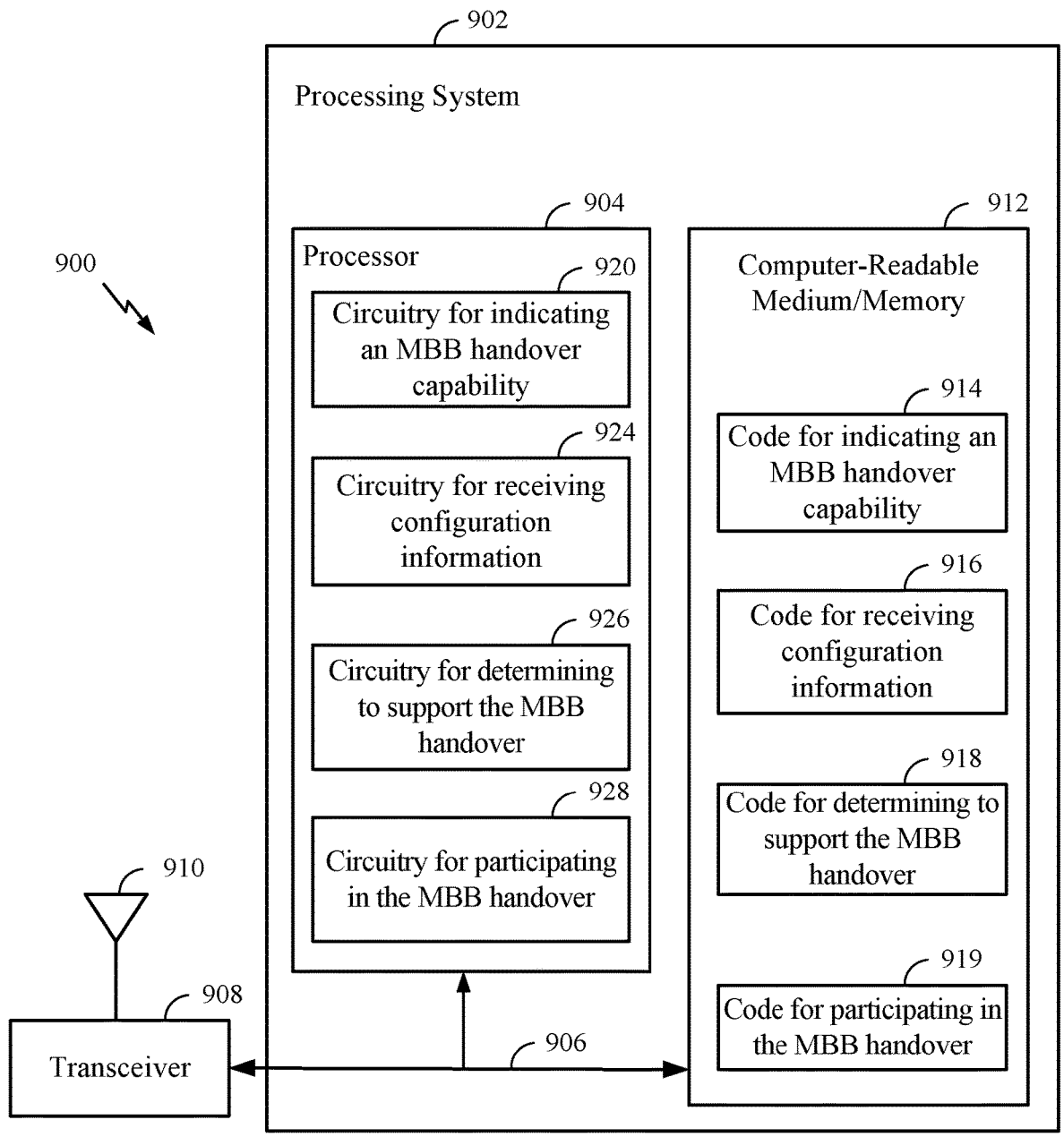
FIG. 9 is a block diagram illustrating a communications device (e.g., a UE) that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein for per-DRB handover operations.

In certain aspects, computer-readable medium/memory 912 stores code 914 for indicating, to a source network entity, a make-before-break (MBB) handover capability of the UE, the MBB handover capability supporting an MBB handover for one or more data radio bearers (DRBs) identified by the source network entity; code 916 for receiving, from the source network entity, configuration information for a handover from the source network entity to a target network entity, the configuration information identifying the one or more DRBs supported for the MBB handover; code 918 for determining to support the MBB handover if the configuration information identifies at least one MBB DRB; and code 919 for participating in the MBB handover according to the configuration information by continuing to maintain a connection with the source network entity and continuing to communicate data with the source network entity via the at least one MBB DRB while establishing a connection with the target network entity until a connection with the source network entity is released.

In certain aspects, the processor 904 has circuitry configured to implement the code stored in the computer-readable medium/memory 912. The processor 904 includes circuitry 920 for indicating, to a source network entity, a make-before-break (MBB) handover capability of the UE, the MBB handover capability supporting an MBB handover for one or more data radio bearers (DRBs) identified by the source network entity; circuitry 924 for receiving, from the source network entity, configuration information for a handover from the source network entity to a target network entity, the configuration information identifying the one or more DRBs supported for the MBB handover; circuitry 926 for determining to support the MBB handover if the configuration information identifies at least one MBB DRB; and circuitry 928 for participating in the MBB handover according to the configuration information by continuing to maintain a connection with the source network entity and continuing to communicate data with the source network entity via the at least one MBB DRB while establishing a connection with the target network entity until a connection with the source network entity is released.

Figure 10:
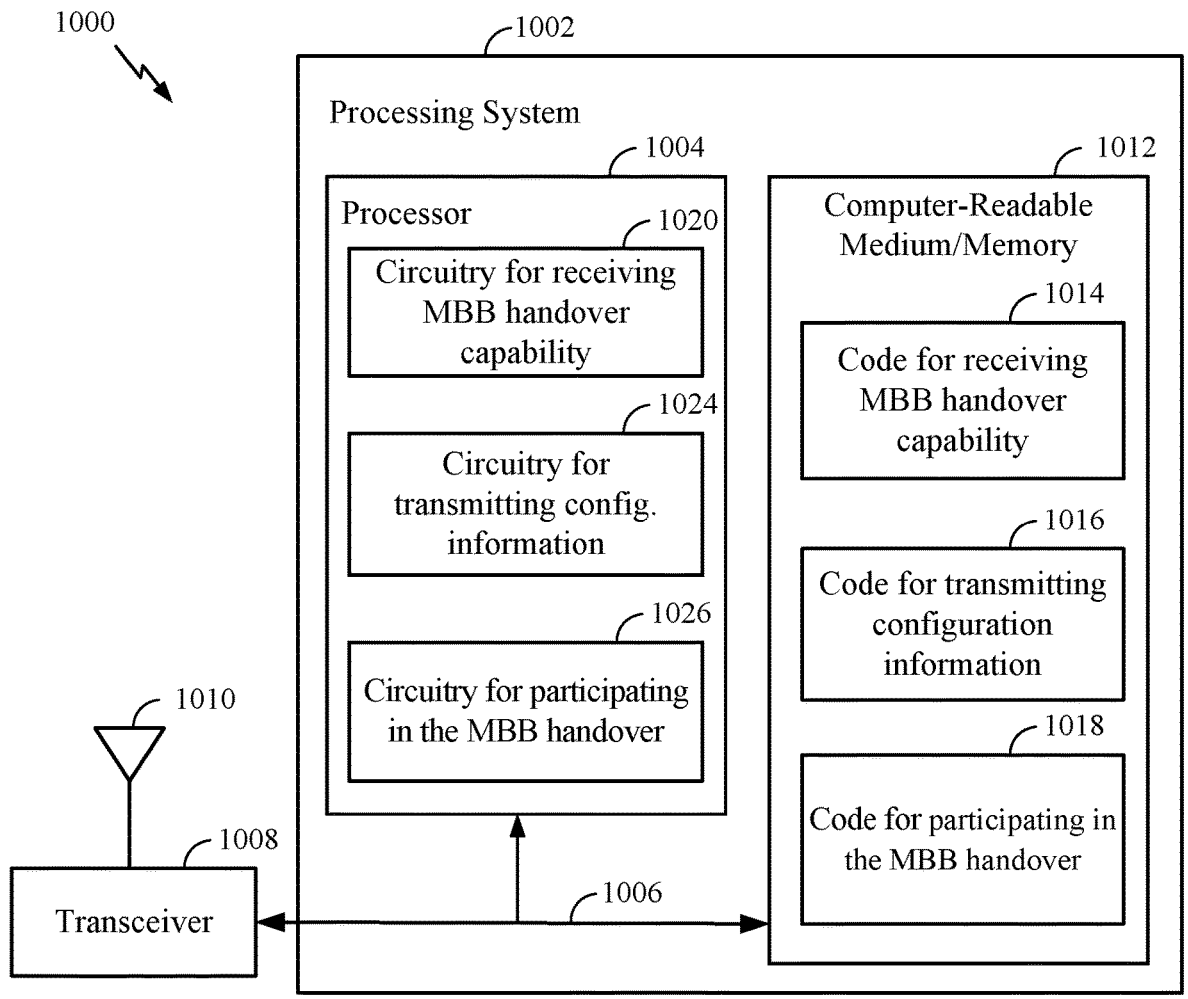
FIG. 10 is a block diagram illustrating a communications device (e.g., a source network entity) that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for per-DRB handover operations.

In certain aspects, computer-readable medium/memory 1012 stores code 1014 for receiving, from a user equipment (UE), a make-before-break (MBB) handover capability of the UE, the MBB handover capability supporting an MBB handover for one or more data radio bearers (DRBs) identified by the source network entity; code 1016 for transmitting configuration information for the MBB handover to the UE, the configuration information identifying the one or more DRBs supported for the MBB handover; and code 1018 for participating in the MBB handover according to the configuration information by continuing to maintain a connection with the UE and continuing to communicate data with the UE via the one or more DRBs supported for the MBB handover while the UE establishes a connection with the target network entity until a connection with the UE is released.

In certain aspects, the processor 1004 has circuitry configured to implement the code stored in the computer-readable medium/memory 1012. The processor 1004 includes circuitry 1020 for receiving, from a user equipment (UE), a make-before-break (MBB) handover capability of the UE, the MBB handover capability supporting an MBB handover for one or more data radio bearers (DRBs) identified by the source network entity; circuitry 1024 for transmitting configuration information for the MBB handover to the UE, the configuration information identifying the one or more DRBs supported for the MBB handover; and circuitry 1026 for participating in the MBB handover according to the configuration information by continuing to maintain a connection with the UE and continuing to communicate data with the UE via the one or more DRBs supported for the MBB handover while the UE establishes a connection with the target network entity until a connection with the UE is released.

Figure 11:
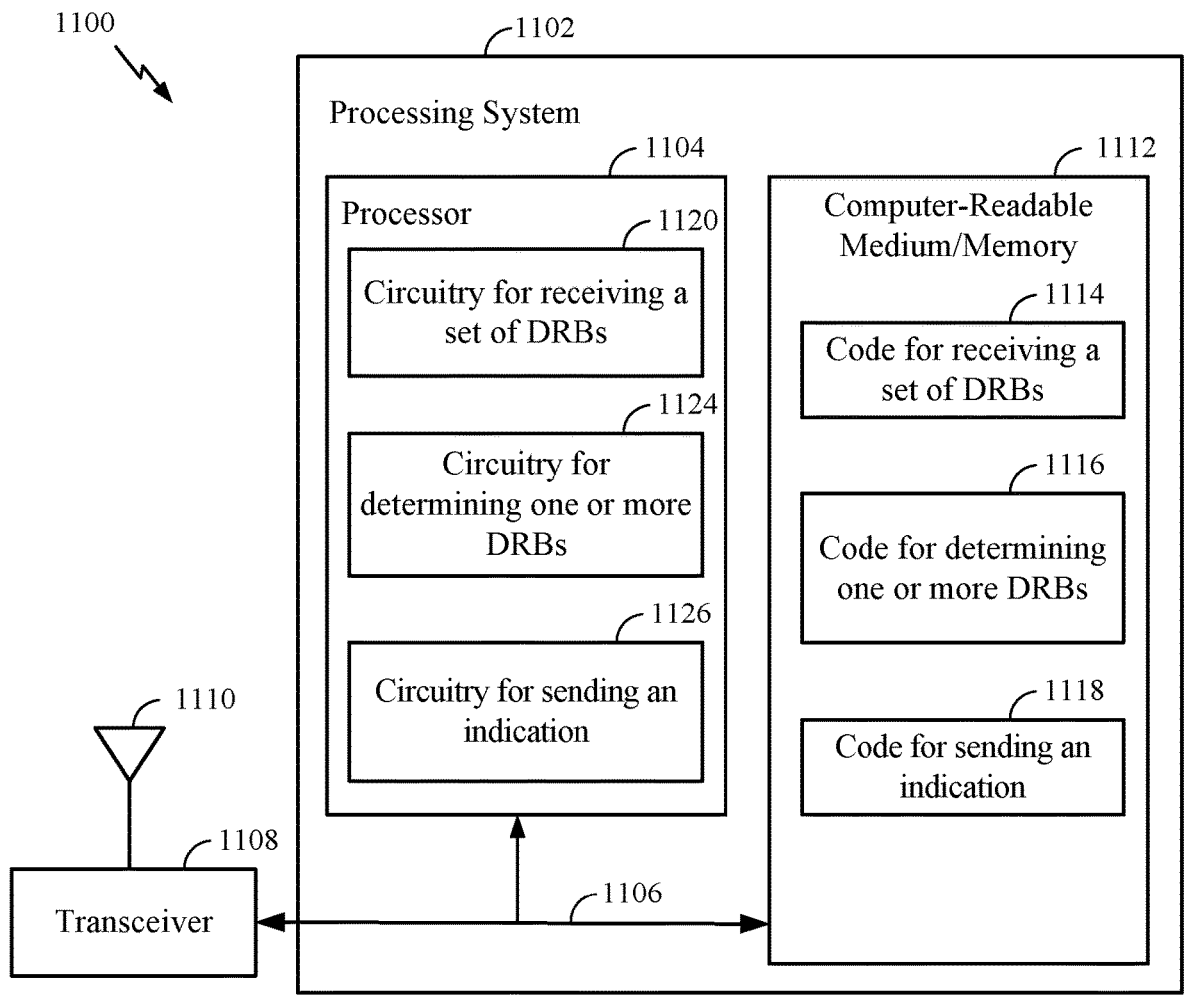
FIG. 11 is a block diagram illustrating a communications device (e.g., a target network entity) that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for per-DRB handover operations.

In certain aspects, computer-readable medium/memory 1112 stores code 1114 for receiving, from a source network entity, a set of one or more data radio bearers (DRBs) to be supported for a make-before-break (MBB) handover of a user equipment (UE) from the source base station to the target base station; code 1116 for determining one or more DRBs of the set of one or more DRBs to support for the MBB handover; and code 1118 for sending, to the source base station, an indication of the determined one or more DRBs the target base station accepts to support for the MBB handover.

In certain aspects, the processor 1104 has circuitry configured to implement the code stored in the computer-readable medium/memory 1112. The processor 1104 includes circuitry 1120 for receiving, from a source network entity, a set of one or more data radio bearers (DRBs) to be supported for a make-before-break (MBB) handover of a user equipment (UE) from the source base station to the target base station; circuitry 1124 for determining one or more DRBs of the set of one or more DRBs to support for the MBB handover; and circuitry 1126 sending, to the source base station, an indication of the determined one or more DRBs the target base station accepts to support for the MBB handover.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Example Embodiments

Embodiment 1: A method of wireless communication performed by a user equipment (UE), comprising: indicating, to a source network entity, a make-before-break (MBB) handover capability of the UE, the MBB handover capability supporting MBB handovers for one or more data radio bearers (DRBs) identified by the source network entity; receiving, from the source network entity, configuration information for a handover from the source network entity to a target network entity, the configuration information identifying the one or more DRBs supported for the MBB handover; determining to support the MBB handover if the configuration information identifies at least one MBB DRB; and participating in the MBB handover according to the configuration information by continuing to maintain a connection with the source network entity and continuing to communicate data with the source network entity via the at least one MBB DRB while establishing a connection with the target network entity until a connection with the source network entity is released.

Embodiment 2: The method of Embodiment 1, wherein indicating the MBB handover capability of the UE further comprises providing signaling to the source network entity indicating at least one of: a maximum number of MBB DRBs supported by the UE; and specific DRBs for the MBB handover.

Embodiment 3: The method of Embodiments 1 or 2, further comprising determining the specific DRBs for the request based on which of the one or more DRBs has a highest quality of service (QoS) relative to another of the one or more DRBs.

Embodiment 4: The method of any of Embodiments 1-3, wherein receiving the configuration information further comprises receiving the configuration information via a radio resource control (RRC) message transmitted by the source network entity, wherein the configuration information is conveyed in a DRB configuration information element (IE) present in the RRC message, and wherein the DRB configuration IE comprises a field to indicate whether the MBB handover is supported for a corresponding DRB.

Embodiment 5: The method of any of Embodiments 1-4, wherein the DRB configuration IE further comprises a second field for reestablishing packet data convergence protocol (PDCP), and wherein the second field is set to false for the corresponding DRB.

Embodiment 6: further comprising participating in the MBB handover after receiving a handover command from the source network entity, wherein participating in the MBB handover further comprises: suspending data communication via a non-MBB DRB with the source network after receiving the handover command; and resuming data communication via the non-MBB DRB with the target network entity after a successful handover to the target network entity, wherein the non-MBB DRB is not identified by the configuration information.

Embodiment 7: The method of any of Embodiments 1-6, further comprising maintaining a source network entity connection configuration for one or more non-MBB DRBs if the UE is performing an MBB handover for at least one MBB DRB.

Embodiment 8: The method of any of Embodiments 1-7, wherein upon detecting a failure of the MBB handover or a radio link failure (RLF) on the target network entity while a connection with at least one MBB DRB is still active, the method further comprises: declaring RLF on the target network entity without triggering a radio resource control (RRC) reestablishment; performing a fallback to the source network entity and operate both non-MBB DRBs and MBB DRBs using the source network entity connection configuration; and sending RLF information to the source network entity, the RLF information comprising a cause of failure and any available target cell measurement results.

Embodiment 9: The method of any of Embodiments 1-8, further comprising triggering a radio resource control (RRC) reestablishment during the MBB handover only when both a source network entity connection fails and a target network entity connection fails.

Embodiment 10: A method of wireless communication performed by a source network entity, comprising: receiving, from a user equipment (UE), a make-before-break (MBB) handover capability of the UE, the MBB handover capability supporting MBB handovers for one or more data radio bearers (DRBs) identified by the source network entity; transmitting configuration information for the MBB handover to the UE, the configuration information identifying the one or more DRBs supported for the MBB handover; and participating in the MBB handover according to the configuration information by continuing to maintain a connection with the UE and continuing to communicate data with the UE via the one or more DRBs supported for the MBB handover while the UE establishes a connection with a target network entity until a connection with the UE is released.

Embodiment 11: The method of Embodiment 10, further comprising: transmitting the target network entity a set of one or more DRBs to be supported for the MBB handover of a user equipment (UE) from the source network entity to the target network entity; receiving, from the target network entity, an indication of one or more of the set of DRBs the target network entity accepts to support for the MBB handover; and including the indication of one or more of the set of DRBs in the configuration information sent to the UE.

Embodiment 12: The method of any of Embodiments 10 or 11, further comprising receiving signaling from the UE or another network entity indicating at least one of: a maximum number of MBB DRBs supported by the UE, or specific DRBs to consider for MBB handover support; and determining which DRBs are to be supported for the MBB handover based, at least in part, on the received signaling.

Embodiment 13: The method of any of Embodiments 10-12, wherein transmitting the configuration information further comprises transmitting the configuration information via a radio resource control (RRC) message, wherein the configuration information is conveyed in a DRB configuration information element (IE) present in the RRC message, and wherein the DRB configuration IE comprises a field to indicate whether the MBB handover is supported for a corresponding DRB.

Embodiment 14: The method of any of Embodiments 10-13, wherein the DRB configuration IE further comprises a second field for reestablishing packet data convergence protocol (PDCP), and wherein the second field is set to false for the corresponding DRB.

Embodiment 15: A method of wireless communication performed by a target network entity, comprising: receiving, from a source network entity, a set of one or more data radio bearers (DRBs) to be supported for a make-before-break (MBB) handover of a user equipment (UE) from the source network entity to the target network entity; determining one or more DRBs of the set of one or more DRBs to support for the MBB handover; and sending, to the source network entity, an indication of the determined one or more DRBs the target network entity accepts to support for the MBB handover.

Embodiment 16: The method of Embodiment 15, wherein the indication is sent to the source network entity in a handover acknowledgment message.

Embodiment 17: A user equipment (UE), comprising: a memory; and a processor communicatively coupled to the memory, the processor and the memory configured to: indicate a make-before-break (MBB) handover capability of the UE, the MBB handover capability supporting MBB handovers for one or more data radio bearers (DRBs) identified by a source network entity; receive, from the source network entity, configuration information for a handover from the source network entity to a target network entity, the configuration information identifying the one or more DRBs supported for the MBB handover; determine to support the MBB handover if the configuration information identifies at least one MBB DRB; and participate in the MBB handover according to the configuration information by continuing to maintain a connection with the source network entity and continuing to communicate data with the source network entity via the at least one MBB DRB while establishing a connection with the target network entity until a connection with the source network entity is released.

Embodiment 18: The UE of Embodiment 17, wherein the processor and the memory, being configured to indicate the MBB handover capability, are further configured to providing signaling to the source network entity indicating at least one of: a maximum number of MBB DRBs supported by the UE; and specific DRBs for the MBB handover.

Embodiment 19: The UE of any of Embodiments 17 or 18, wherein the processor and the memory are further configured to determine the specific DRBs for the request based on which of the one or more DRBs has a highest quality of service (QoS) relative to another of the one or more DRBs.

Embodiment 20: The UE of any of Embodiments 17-19, wherein the processor and the memory are further configured to receive the configuration information via a radio resource control (RRC) message transmitted by the source network entity, wherein the configuration information is conveyed in a DRB configuration information element (IE) present in the RRC message, and wherein the DRB configuration IE comprises a field to indicate whether the MBB handover is supported for a corresponding DRB.

Embodiment 21: The UE of any of Embodiments 17-20, wherein the DRB configuration IE further comprises a second field for reestablishing packet data convergence protocol (PDCP), and wherein the second field is set to false for the corresponding DRB.

Embodiment 22: The UE of any of Embodiments 17-21, wherein the processor and the memory, being configured to participate in the MBB handover after receiving a handover command from the source network entity, are further configured to: suspend data communication via a non-MBB DRB with the source network entity after receiving the handover command; and resume data communication via the non-MBB DRB with the target network entity after a successful handover to the target network entity, wherein the non-MBB DRB is not identified by the configuration information Embodiment 23: The UE of any of Embodiments 17-22, wherein the processor and the memory are further configured to maintain a source network entity connection configuration for one or more non-MBB DRBs if the UE is performing an MBB handover for at least one MBB DRB.

Embodiment 24: The UE of any of Embodiments 17-23, wherein the processor and the memory are further configured to, upon detecting a failure of the MBB handover or a radio link failure (RLF) on the target network entity while a connection with at least one MBB DRB is still active: declare RLF on the target network entity without triggering a radio resource control (RRC) reestablishment; perform a fallback to the source network entity and operate both non-MBB DRBs and MBB DRBs using the source network entity connection configuration; and send RLF information to the source network entity, the RLF information comprising a cause of failure and any available target cell measurement results.

Embodiment 25: The UE of any of Embodiments 17-24, wherein the processor and the memory are further configured to trigger a radio resource control (RRC) reestablishment during the MBB handover only when both a source network entity connection fails and a target network entity connection fails.

Embodiment 26: A source network entity, comprising: a memory; and a processor communicatively coupled to the memory, the processor and the memory configured to: receive, from a user equipment (UE), a make-before-break (MBB) handover capability of the UE, the MBB handover capability supporting MBB handovers for one or more data radio bearers (DRBs) identified by the source network entity; transmit configuration information for the MBB handover to the UE, the configuration information identifying the one or more DRBs supported for the MBB handover; and participate in the MBB handover according to the configuration information by continuing to maintain a connection with the UE and continuing to communicate data with the UE via the one or more DRBs supported for the MBB handover while the UE establishes a connection with a target network entity until a connection with the UE is released.

Embodiment 27: The source network entity of Embodiment 26, wherein the processor and the memory are further configured to: transmit, to the target network entity, a set of one or more DRBs to be supported for the MBB handover of a user equipment (UE) from the source network entity to the target network entity; receive, from the target network entity, an indication of one or more of the set of DRBs the target network entity accepts to support for the MBB handover; and include the indication of one or more of the set of DRBs in the configuration information sent to the UE.

Embodiment 28: The source network entity of any of Embodiments 26 or 27, wherein the processor and the memory are further configured to: receive signaling from the UE or another network entity indicating at least one of: a maximum number of MBB DRBs supported by the UE, or specific DRBs to consider for MBB handover support; and determine which DRBs are to be supported for the MBB handover based, at least in part, on the received signaling.

Embodiment 29: The source network entity of any of Embodiments 26-28, wherein the processor and the memory, being configured to transmit configuration information, are also configured to transmit the configuration information via a radio resource control (RRC) message, wherein the configuration information is conveyed in a DRB configuration information element (IE) present in the RRC message, and wherein the DRB configuration IE comprises a field to indicate whether the MBB handover is supported for a corresponding DRB.

Embodiment 30: A target network entity, comprising: a memory; and a processor communicatively coupled to the memory, the processor and the memory configured to: receive, from a source network entity, a set of one or more data radio bearers (DRBs) to be supported for a make-before-break (MBB) handover of a user equipment (UE) from the source network entity to the target network entity; determine one or more DRBs of the set of one or more DRBs to support for the MBB handover; and send, to the source network entity, an indication of the determined one or more DRBs the target network entity accepts to support for the MBB handover.

Embodiment 31: The target network entity of Embodiment 30, wherein the indication is sent to the source network entity in a handover acknowledgment message.

Embodiment 32: The target network entity of any of Embodiments 30 or 31, wherein the handover acknowledgment message is configured to indicate acceptance of each DRB in the set of one or more DRBs.

Embodiment 33: The target network entity of any of Embodiments 30-32, wherein the determined one or more DRBs include at least one DRB requested by the UE.

Embodiment 34: The target network entity of any of Embodiments 30-33, further comprising determining the one or more DRBs based on which of the one or more DRBs the target network entity has the capability to support.

Embodiment 35: The target network entity of any of Embodiments 30-34, wherein each DRB in the set of one or more DRBs were requested by the UE in a communication to the source network entity.

Embodiment 36: The UE of any of Embodiments 17-25, wherein the UE is further configured to continue to maintain a connection with the source network entity and continue to communicate data with the source network entity via the at least one MBB DRB after receiving a handover command from the source network entity and before connection with the source network entity is released.

Additional Considerations

In certain aspects, UL/DL Mobility interruption time greater than 0ms does not always result in service interruption. In some examples, MBB handover support is critical to reduce the service interruption time for some services/DRBs. In some examples, DRBs supported during MBB handover are setup with individual logical channels to support two separate PHY/MAC/RLC entities for source and target connection. In some examples, maximum logical channels that can be supported per UE determine the number of DRBs that can be supported during MBB HO.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication performed by a user equipment (UE), comprising:
   indicating, to a source network entity, a make-before-break (MBB) handover capability of the UE, the MBB handover capability supporting MBB handovers for one or more data radio bearers (DRBs) identified by the source network entity;
   receiving, via a radio resource control (RRC) message transmitted by the source network entity, configuration information for a handover from the source network entity to a target network entity, wherein:
      the configuration information is conveyed in a DRB configuration information element (IE) in the RRC message and identifies the one or more DRBs to be supported for the MBB handover, and
      the DRB configuration IE comprises:
         a field indicating whether the MBB handover is supported for a corresponding DRB, and
         an indication to not reestablish packet data convergence protocol (PDCP) for the corresponding DRB;
   determining to support the MBB handover if the configuration information identifies at least one MBB DRB; and
   participating in the MBB handover according to the configuration information by continuing to maintain a connection with the source network entity and continuing to communicate data with the source network entity via the at least one MBB DRB while establishing a connection with the target network entity until a connection with the source network entity is released.

2. The method of claim 1, wherein indicating the MBB handover capability of the UE further comprises providing signaling to the source network entity indicating at least one of:
   a maximum number of MBB DRBs supported by the UE; or
   specific DRBs to consider for MBB handover support.

3. The method of claim 1, further comprising indicating a set of DRBs to consider for the MBB handover based on one or more DRB conditions, wherein the one or more DRB conditions comprise at least one of:
   whether the one or more DRBs provide a communication path having the least amount of interference based on reference signal received power (RSRP);
   whether the one or more DRBs provide a communication path having the least amount of interference based on reference signal received quality (RSRQ);
   whether the one or more DRBs provide a communication path having the least amount of interference based on signal to noise interference (SINR) measurements; or
   whether quality of service (QoS) requirements of the one or more DRBs support ultra-reliable low latency communication (URLLC) services.

4. The method of claim 1, further comprising receiving a handover command from the source network entity, wherein:
   participating in the MBB handover is based on the handover command; and
   participating in the MBB handover further comprises:
   suspending data communication via a non-MBB DRB with the source network after receiving the handover command; and
   resuming data communication via the non-MBB DRB with the target network entity after a successful handover to the target network entity, wherein the non-MBB DRB is not identified by the configuration information.

5. The method of claim 1, further comprising maintaining a source network entity connection configuration for one or more non-MBB DRBs if the MBB handover is for at least one MBB DRB.

6. The method of claim 5, wherein upon detecting a failure of the MBB handover or a radio link failure (RLF) on the target network entity while a connection with at least one MBB DRB is still active, the method further comprises:
   declaring an RLF on the target network entity without triggering a radio resource control (RRC) reestablishment;
   performing a fallback to the source network entity and operating both non-MBB DRBs and MBB DRBs using the source network entity connection configuration; and
   sending RLF information to the source network entity, the RLF information comprising a cause of failure and any available target cell measurement results.

7. The method of claim 1, further comprising triggering an RRC reestablishment during the MBB handover only when both a source network entity connection fails and a target network entity connection fails.

8. A method of wireless communication performed by a source network entity, comprising:
   receiving, from a user equipment (UE), a make-before-break (MBB) handover capability of the UE, the MBB handover capability supporting MBB handovers for one or more data radio bearers (DRBs) identified by the source network entity;
   transmitting, via a radio resource control (RRC) message, configuration information for the MBB handover to the UE, wherein:
      the configuration information is conveyed in a DRB configuration information element (IE) in the RRC message and identified the one or more DRBs supported for the MBB handover, and
      the DRB configuration IE comprises:
         a field indicating whether the MBB handover is supported for a corresponding DRB, and
         an indication to not reestablish packet data convergence protocol (PDCP) for the corresponding DRB; and
   participating in the MBB handover according to the configuration information by continuing to maintain a connection with the UE and continuing to communicate data with the UE via the one or more DRBs supported for the MBB handover while the UE establishes a connection with a target network entity until a connection with the UE is released.

9. The method of claim 8, further comprising:
transmitting the target network entity a set of one or more DRBs to be supported for the MBB handover of a user equipment (UE) from the source network entity to the target network entity;
receiving, from the target network entity, an indication of one or more of the set of DRBs the target network entity accepts to support for the MBB handover; and
including the indication of one or more of the set of DRBs in the configuration information sent to the UE.

10. The method of claim 8, further comprising:
receiving signaling from the UE or another network entity indicating at least one of: a maximum number of MBB DRBs supported by the UE, or specific DRBs to consider for MBB handover support; and
determining which DRBs are to be supported for the MBB handover based, at least in part, on the received signaling.

11. An apparatus for wireless communication at a user equipment (UE), comprising:
one or more processors configured to execute instructions stored on one or more memories and to cause the UE to:
indicate a make-before-break (MBB) handover capability of the UE, the MBB handover capability supporting MBB handovers for one or more data radio bearers (DRBs) identified by a source network entity;
receive, via a radio resource control (RRC) message transmitted by the source network entity, configuration information for a handover from the source network entity to a target network entity, wherein:
the configuration information is conveyed in a DRB configuration information element (IE) in the RRC message and identifies the one or more DRBs to be supported for the MBB handover, and
the DRB configuration IE comprises:
a field indicating whether the MBB handover is supported for a corresponding DRB, and
an indication to not reestablish packet data convergence protocol (PDCP) for the corresponding DRB;
determine to support the MBB handover if the configuration information identifies at least one MBB DRB; and
participate in the MBB handover according to the configuration information by continuing to maintain a connection with the source network entity and continuing to communicate data with the source network entity via the at least one MBB DRB while establishing a connection with the target network entity until a connection with the source network entity is released.

12. The apparatus of claim 11, wherein, in order to indicate indicate the MBB handover capability, the one or more processors are further configured to cause the UE to provide signaling to the source network entity indicating a maximum number of MBB DRBs supported by the UE.

13. The apparatus of claim 12, wherein the one or more processors are further configured to cause the UE to indicate a set of DRBs to consider for the MBB handover based on one or more DRB conditions, wherein the one or more DRB conditions comprise at least one of:

whether the one or more DRBs provide a communication path having the least amount of interference based on reference signal received power (RSRP);
whether the one or more DRBs provide a communication path having the least amount of interference based on reference signal received quality (RSRQ);
whether the one or more DRBs provide a communication path having the least amount of interference based on signal to noise interference (SINR) measurements; or
whether quality of service (QOS) requirements of the one or more DRBs support ultra-reliable low latency communication (URLLC) services.

14. The apparatus of claim 11, wherein:
the one or more processors are further configured to cause the UE to receive a handover command from the source network entity;
the one or more processors are further configured to cause the UE to participate in the MBB handover based on the handover command; and
in order to participate in the MBB handover, the one or more processors are further configured to cause the UE to:
suspend data communication via a non-MBB DRB with the source network entity after receiving the handover command; and
resume data communication via the non-MBB DRB with the target network entity after a successful handover to the target network entity, wherein the non-MBB DRB is not identified by the configuration information.

15. The apparatus of claim 11, wherein the one or more processors are further configured to cause the UE to maintain a source network entity connection configuration for one or more non-MBB DRBs if the MBB handover is for at least one MBB DRB.

16. The apparatus of claim 15, wherein upon detecting a failure of the MBB handover or a radio link failure (RLF) on the target network entity while a connection with at least one MBB DRB is still active, the one or more processors are further configured to cause the UE to:
declare RLF on the target network entity without triggering a radio resource control (RRC) reestablishment;
perform a fallback to the source network entity and operate both non-MBB DRBs and MBB DRBs using the source network entity connection configuration; and
send RLF information to the source network entity, the RLF information comprising a cause of failure and any available target cell measurement results.

17. The apparatus of claim 11, wherein the one or more processors are further configured to cause the UE to trigger an RRC reestablishment during the MBB handover only when both a source network entity connection fails and a target network entity connection fails.

18. The apparatus of claim 11, wherein the one or more processors are further configured to cause the UE to maintain a connection with the source network entity and continue to communicate data with the source network entity via the at least one MBB DRB after receiving a handover command from the source network entity and before connection with the source network entity is released.

* * * * *